(12) United States Patent
Shimizu et al.

(10) Patent No.: US 6,552,127 B1
(45) Date of Patent: Apr. 22, 2003

(54) THERMOPLASTIC RESIN COMPOSITION

(75) Inventors: Tetsuo Shimizu, Settsu (JP); Yoshihisa Yamamoto, Settsu (JP); Seitaro Yamaguchi, Settsu (JP); Nobuhiko Tsuda, Settsu (JP); Noriyasu Yamane, Settsu (JP); Takafumi Yamato, Settsu (JP); Masahiro Kumegawa, Settsu (JP); Takayuki Araki, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/540,759

(22) Filed: Mar. 31, 2000

Related U.S. Application Data

(62) Division of application No. 09/186,427, filed on Nov. 5, 1998, now Pat. No. 6,054,537, which is a division of application No. 08/838,063, filed on Apr. 17, 1997, now Pat. No. 5,869,574, which is a division of application No. 08/284,548, filed as application No. PCT/JP93/01784 on Dec. 8, 1993, now Pat. No. 5,750,626.

(30) Foreign Application Priority Data

Dec. 10, 1992 (JP) .............................. 4-353104
Jun. 4, 1993 (JP) .............................. 5-160329

(51) Int. Cl.$^7$ .................. C08L 67/02; C08L 69/00; C08L 71/10; C08L 79/00; C08L 81/00
(52) U.S. Cl. ............... 525/148; 525/132; 525/146; 525/165; 525/176; 525/178; 525/180; 525/151; 525/153; 525/182; 525/183; 525/185; 525/189
(58) Field of Search ................. 525/148, 165, 525/176, 178, 180, 182, 183, 153, 132, 146, 151, 185, 189

(56) References Cited

FOREIGN PATENT DOCUMENTS

| EP | 275186 | 7/1988 |
|---|---|---|
| JP | 62057448 | 3/1987 |
| JP | 63081159 | 4/1988 |
| JP | 63172749 | 7/1988 |
| JP | 63264672 | 11/1988 |
| JP | 3215548 | 9/1991 |
| JP | 3263464 | 11/1991 |

*Primary Examiner*—Patricia A. Short
(74) *Attorney, Agent, or Firm*—Varndell & Varndell, PLLC

(57) ABSTRACT

A thermoplastic resin composition comprising a blend obtainable by blending 0.1 to 99% by weight of (a) a fluorine-containing polymer having a number-average molecular weight of 2000 to 1000000 and having hydroxy group or epoxy group at least at one of end portions of a main chain and side chain of the polymer, and 1 to 99.9% by weight of (b) a heat resisting thermoplastic resin having a crystalline melting point or glass transition temperature of not less than 150° C. The present invention can provide a composition comprising various heat resisting thermoplastic resins and a fluorine-containing polymer having a functional group which is capable of developing an affinity with said resins and forming a uniform dispersion

1 Claim, 7 Drawing Sheets

THERMOPLASTIC RESIN COMPOSITION

CROSS-REFERENCE TO BELATED APPLICATIONS

This application is a divisional application of Ser. No. 09/186,427 filed Nov. 5, 1998, now U.S. Pat. No. 6,054,537, which is a divisional application of Ser. No. 08/838,063 filed Apr. 17, 1997, now U.S. Pat. No. 5,869,574, which is a divisional application of Ser. No. 08/284,548 filed Aug. 9, 1994, now U.S. Pat. No. 5,750,626, which is a U.S. national phase application of International Application No. PCT/JP93/01784 filed Dec. 8, 1993.

TECHNICAL FIELD

The present invention relates to a thermoplastic resin composition which comprises a specific fluorine-containing polymer having a functional group and a thermoplastic resin having a crystalline melting point or glass transition temperature of not less than 150° C., and has improved mechanical and chemical properties.

BACKGROUND ARTS

Heat resisting crystalline thermoplastic resins (having a crystalline melting point of not less than 150° C.) such as polyacetals, polyamides, aromatic polyesters, polyarylene sulfides, polyketones, polyether ketones, polyamide imides and polyether nitrites are excellent in mechanical properties and moreover moldability, and therefore are used for functional parts for automobiles, industrial machineries, office automation equipments, and electrical and electronic equipments. Meanwhile there is a market demand for higher chemical resistance, sliding properties and the like, and particularly impact resistance is desired to be enhanced because those resins are generally brittle. Also, heat resisting amorphous thermoplastic resins (having a glass transition temperature of hot less than 150° C.) such as polycarbonates, polyphenylene ethers, polyalylates, polysulphones, polyether sulphones, and polyetherimides are widely used for making the best use of transparency, dimensional stability, impact resistance, and the like, but generally there are problems with chemical resistance, solvent resistance and moldability.

Fluorine-containing resins such as polytetrafluoroethylene (PTFE), tetrafluoroethylene/perfluoro-alkyl vinyl ether copolymer (PFA), tetrafluoroethylene/hexafluoropropylene copolymer (FEP), polyvinylidene fluoride (PVDF) and ethylene/tetrafluoroethylene copolymer (ETFE) are excellent in thermal resistance, chemical resistance, solvent resistance, weather resistance, sliding properties, pliability, electrical properties and the like, and are widely used for automobiles, industrial machineries, office automation equipments, electrical and electronic equipments, and the like. However, there are many cases where those resins are inferior in mechanical properties and physical thermal resistance as represented by a deflection temperature under load, as compared with heat resisting crystalline thermoplastic resins, and the uses thereof are within the limited range because the dimensional stability is inferior as compared with heat resisting amorphous thermoplastic resins.

Attempts have been actively made to obtain novel materials by combining a fluorine-containing polymer (including resinous and elastomeric form) with the aforementioned heat resisting thermoplastic resins having no fluorine to modify such resins to eliminate disadvantages of the resins, and on the contrary by combining mainly a resinous fluorine-containing polymer with the heat resisting thermoplastic resin having no fluorine to modify such polymers.

First, as an example for simply melting and blending by the use of a kneading machine, JP-A-202344/1982 discloses that a fluorine-containing elastomer commercially available is added to improve impact resistance, crack resistance and strength against thermal shock without imparing properties of polyarylene sulfides such as thermal resistance, chemical resistance, and the like. Also, JP-A-165647/1989 and JP-A-110156/1990 disclose that a polymer, that is to say, a liquid crystal polymer (aromatic polyester or the like) forming an anisotropic melt is added to decrease a coefficient of linear expansion without impairing weather resistance, chemical resistance, wear resistance and anti-soil property of a fluorine-containing polymer such as a PVDF and further to improve mechanical properties and moldability. As examples of a blend of a liquid crystal polymer and a PTFE, there are JP-B-5693/1992 and JP-A-230756/1988. JP-A-7850/1975 discloses that it is effective to blend the PVDF for improving water absorption and hygroscopicity of polyamides.

Furthermore, JP-A-23448/1985 discloses an example that a property of release from a mold is improved by blending a fluorine-containing polymer with an aromatic polysulphone composition of which shrinkage from mold dimensions has been decreased by blending fibrous reinforcements such as glass fiber and wollastonite and inorganic fillers such as talc and glass beads.

Also, attempts have been widely and generally made to improve sliding properties of various synthetic resins by blending a PTFE powder.

However, since a surface energy of a fluorine-containing polymer is small, there is a problem that such a polymer is generally short of an affinity with other materials. Therefore, when the fluorine-containing polymer and other materials are melted and blended, there occurs a phase separation. Interfacial adhesion thereof is nearly nothing substantially, and an interfacial adhesive failure occurs easily, the fluorine-containing polymer is difficult to be dispersed in other materials during blending, and an aggregation occurs. Thus it is difficult to display an effect of blending that polymer.

In order to eliminate such drawbacks and to enhance an affinity between different polymers, it is often conducted to add so-called compatibilizing agents as the third component. JP-A-218446/1987 discloses a composition prepared by blending a thermoplastic fluorine-containing elastomer to improve impact resistance of polyarylene sulfides without imparing flowability thereof, and that patent publication describes that it is more effective to add a fluoroaliphatic group-containing polymer to improve an affinity of the polymer. Also, JP-A-62853/1988 discloses a method to add, as a compatibilizing agent, a graft polymer comprising a vinyl polymer having epoxy group and a methyl methacrylate polymer or an acrylonitrile/styrene copolymer when blending polyarylene sulfides and thermoplastic resins containing a PVDF.

Also, claim 2 of the mentioned TP-A-165647/1986, JP-A-197551/1986 and JP-A-263144/1986 disclose that it is more effective to add an acrylic polymer, polyvinyl acetate and polyvinyl methyl ketone, respectively than a simple blending, in blending a PVDF and a polymer forming an anisotropic melt.

JP-A-11109/1989 discloses an example of using, as a compatibilizing agent for blending polyamides and PVDF, a block polymer comprising any one of N-vinylpyrrolidone or methyl(meta)acrylate and any one of unsaturated ethylenic monomer, polycondensated monomer or lactam.

Also, JP-A-98650/1986 and JP-A-110550/1986 disclose that when blending a polyphenylene ether and a fluorine-containing polymer like a PVDF, a copolymer comprising polystyrene and an acrylic polymer is used as a compatibilizing agent, taking advantage of an excellent compatibility of polyphenylene ether with polystyrene and PVDF with acrylic polymer.

However, in JP-A-218446/1987, an effect of an improvement in affinity property is insufficient. It may be because a fluoroaliphatic group in an compatibilizing agent is of low polymerization having carbon atoms of not less than 20. All the other publications substantially describes the examples of using compatibilizing agents having no fluorine, which are synthesized, making use of an excellent affinity between a PVDF and a carbonyl group-containing polymer such as acrylic polymer, and the fluorine-containing polymer is limited to the PVDF. In the method to improve an affinity by the use of such a compatibilizing agent, there is a problem that physical properties of the molded articles deteriorate because chemical resistance and thermal resistance of the compatibilizing agents themselves are inferior to that of a main component, i.e. the polymer.

Also, attempts have been made to improve dispersibility of a composition comprising a fluorine-containing polymer and a thermoplastic resin, by a so-called dynamic vulcanization. TP-A-185042/1991 discloses that, when blending a crosslinkable fluorine-containing elastomer and a thermoplastic polymer having a crystalline melting point or glass transition temperature of not less than 150° C., the dispersibility is enhanced and a thermoplastic elastomer can be obtained by vulcanizing the fluorine-containing elastomer during melting and blending. JP-A-172352/1991 also discloses that a fine dispersion of a fluorine-containing rubber is achieved by improving impact resistance of a polyphenylene sulfide by the use of a fluorine-containing elastomer by utilizing the dynamic vulcanization method.

Though those dynamic vulcanization methods are economically advantageous since the vulcanization of the fluorine-containing elastomer is carried out during melting and blending with other materials, there is a problem that impurities resulting from vulcanizing agents and other additives, which are used in the usual vulcanization methods, remain in a composition, and properties such as chemical resistance of a molded article deteriorate.

On the other hand, there are reports on a composition using a fluorine-containing polymer having a reactive functional group. JP-A-105062/1988, JP-A-254155/1988 and JP-A-264672/1988 disclose examples of blending a matrix polymer and, for instance, a fluoropolyether in which a functional group is introduced at the end thereof, a polymer containing a functional group and a polyfluoroalkyl group having carbon atoms of 2 to 20 and a fluorine-containing elastomer having a functional group. However, any of those examples is a manner to form, a network structure by dispersing the polymer having two kinds of functional groups in the matrix polymer and causing an inter-reaction therebetween and to physically bond that network structure to the matrix polymer, but not a manner to directly utilize a chemical affinity and reactivity with the matrix polymer.

Thus a combination of functional groups of not less than two kinds reacting with each other is necessary without fail, and also it is necessary to provide the conditions for forming the network structure by those functional groups. Also, a fluoropolyether is usually obtained as an oily substance and is expensive, and an effect of addition thereof is only limited to an improvement of lubricity of the matrix polymer. Furthermore exemplified is only such a polyfluoroalkyl group-containing polymer of a low molecular weight which is difficult to be prescribed as a polymer.

As mentioned hereinabove, when blending a fluorine-containing polymer and a thermoplastic resin, it is difficult to obtain a blend having stable characteristics because the fluorine-containing polymer is generally short of an affinity, and physical properties of the molded article obtained using that polymer are deteriorated. In order to improve the affinity, various studies have been made in relation to additives, but the present status is such that a composition comprising a fluorine-containing polymer and a thermoplastic resin, which do not deteriorate thermal resistance, chemical resistance and the like of the composition, has not yet been obtained.

The object of the present invention is to provide a composition comprising various heat resisting thermoplastic resins and fluorine-containing polymers having a functional group, which have a good affinity with he resins and are capable of forming uniform dispersing conditions.

DISCLOSURE OF THE INVENTION

The thermoplastic resin composition of the resent invention comprises a blend obtainable by blending (a) 0.1 to 99% (% by weight, hereinafter the same) of a fluorine-containing polymer having a functional group and (b) 1 to 99.9% of a heat resisting thermoplastic resin having a crystalline melting point or glass transition temperature of not less than 150° C.; said fluorine-containing polymer (a) having the functional group is at least one selected from fluorine-containing polymers having functional groups, in which a concentration of the functional groups at the end portion of a main chain and the side chain portion is 2 to 2000 μmol/g per the total weight of the fluorine-containing polymer, represented by the formula [I],

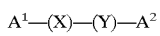

$$A^1-(X)-(Y)-A^2 \qquad [I]$$

wherein X is a structural unit of the formula —(CH$_2$CX$^1$X$^2$)— (wherein X$^1$ and X$^2$ are the same or different, and each is hydrogen atom, fluorine atom, —(CH$_2$)$_p$(O)$_q$—R—B$^1$ (R is a dihydric hydrocarbon group having carbon atoms of 1 to 20 or dihydric fluorine-substituted organic group having carbon atoms of 1 to 20, B$^1$ is hydrogen atom, fluorine atom, hydroxy group or epoxy group, p is 0 or 1 and q is 0 or 1), —OCOR—B$^1$ (R and B$^1$ are the same as above) or —COO—R—B$^1$ (R and B$^1$ are the same as above));

Y is a structural unit of the formula —(CF$_2$CY$^1$Y$^2$)— (wherein Y$^1$ and Y2 are the same or different, and each is hydrogen atom, fluorine atom, chlorine atom, —(CF$_2$))$_r$—(O)$_s$—(R$_f$)$_t$(CH$_2$)$_u$B$^2$ (R$_f$ is a dihydric fluorine-substituted organic group having carbon atoms of 1 to 14, B$^2$ is hydrogen atom, halogen atom, hydroxy group, epoxy group or glycidyloxy group, r is 0 or 1, s is 0 or 1, t is 0 or 1, and u is an integer of 1 to 3) or —(CF$_2$)$_v$—B$^3$ (B$^3$ is, hydrogen atom, fluorine atom or chlorine atom, v is an integer of 1 to 10));

both A$^1$ and A$^2$ are end portions of a main chain; provided that each of X and Y may comprise two or more structural units;

Y may not be present when X has the structural unit derived from CH$_f$=CHF, CH$_2$=CF$_2$ or fluoroalkyl-α-substituted acrylate (substituent is hydrogen atom, fluorine atom or methyl);

X may not be present when Y has the structural unit derived from $CF_2=CF_2$ or $CF_2=CFCl$;

at least one of $A^1$ and $A^2$ contains hydroxy group, epoxy group or glycidyl group when both of X and Y do not contain hydroxy group, epoxy group or glycidyl group.

PREFERRED EMBODIMENTS OF THE INVENTION

Figure 1:
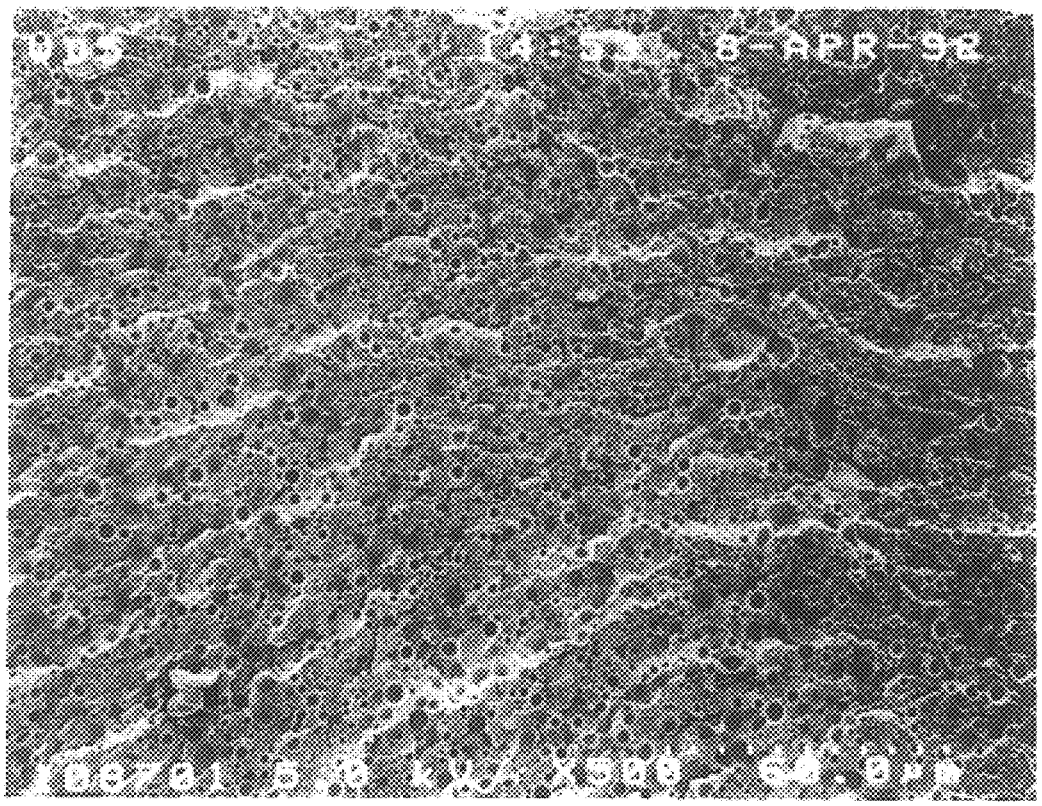
FIG. 1 is a microscopic photograph of a cut surface of the molded article obtained in Example 2.
Figure 2:
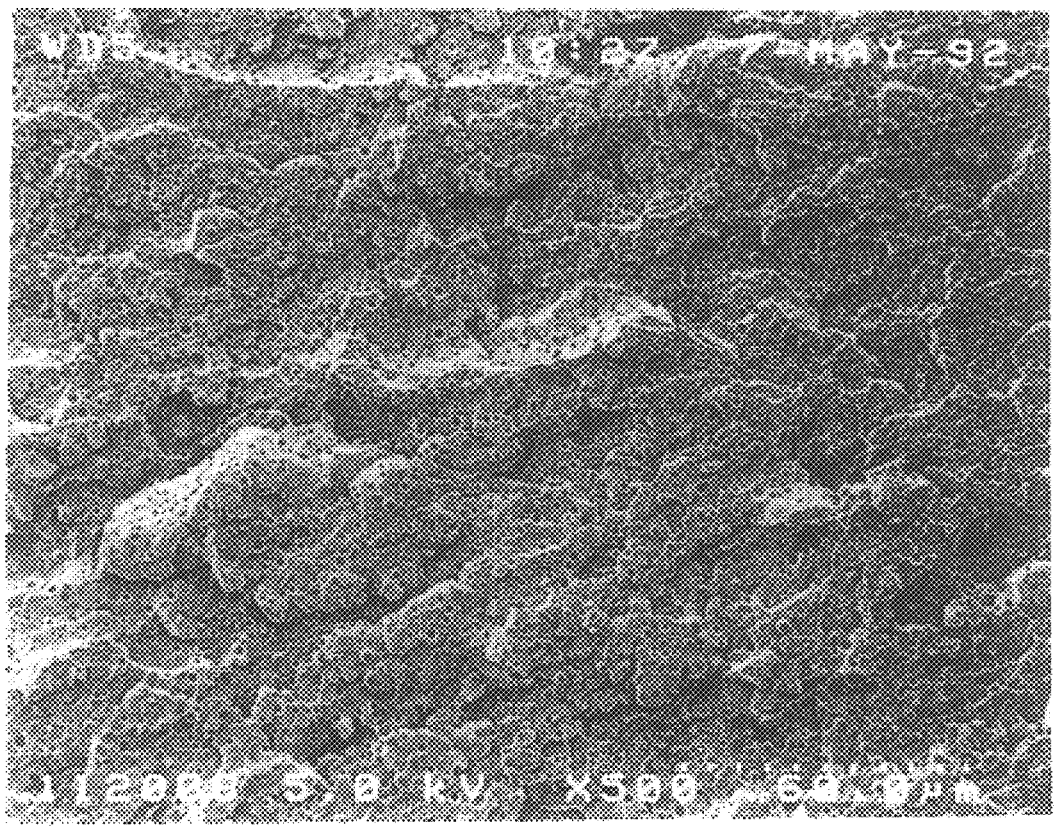
FIG. 2 is a microscopic photograph of a cut surface of the molded article obtained in Example 3.
Figure 3:
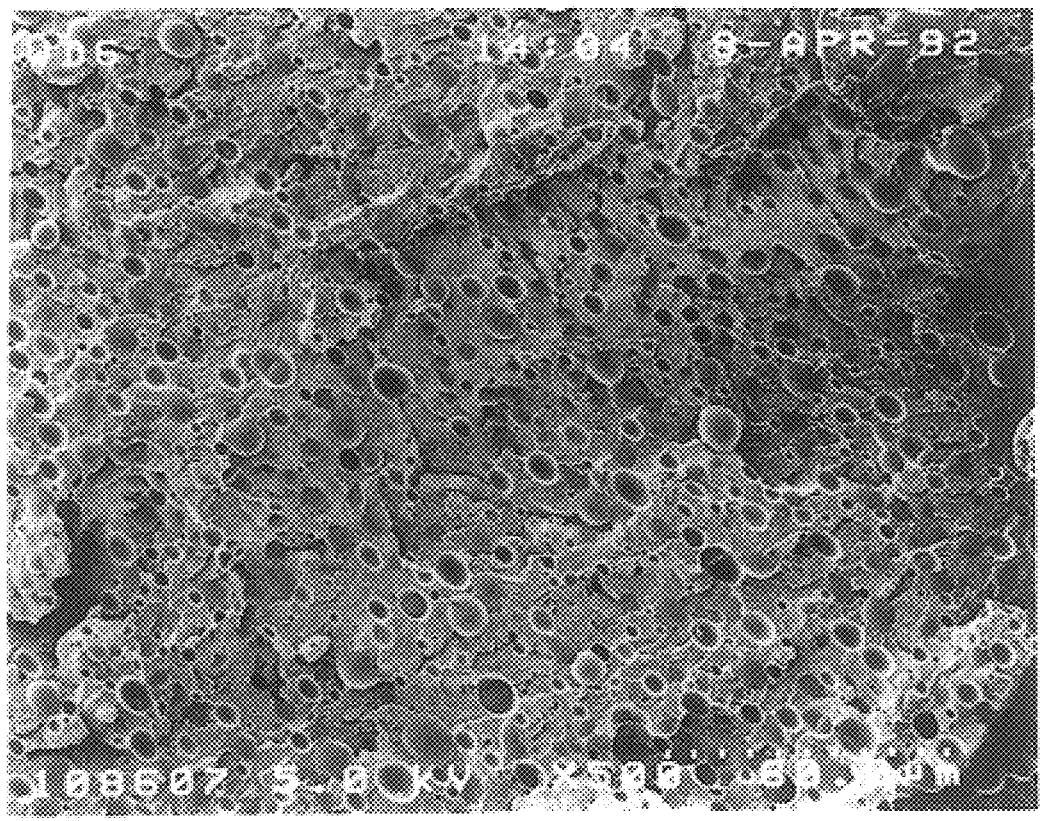
FIG. 3 is a microscopic photograph of a cut surface of the molded article obtained in Comparative Example 1.
Figure 4:
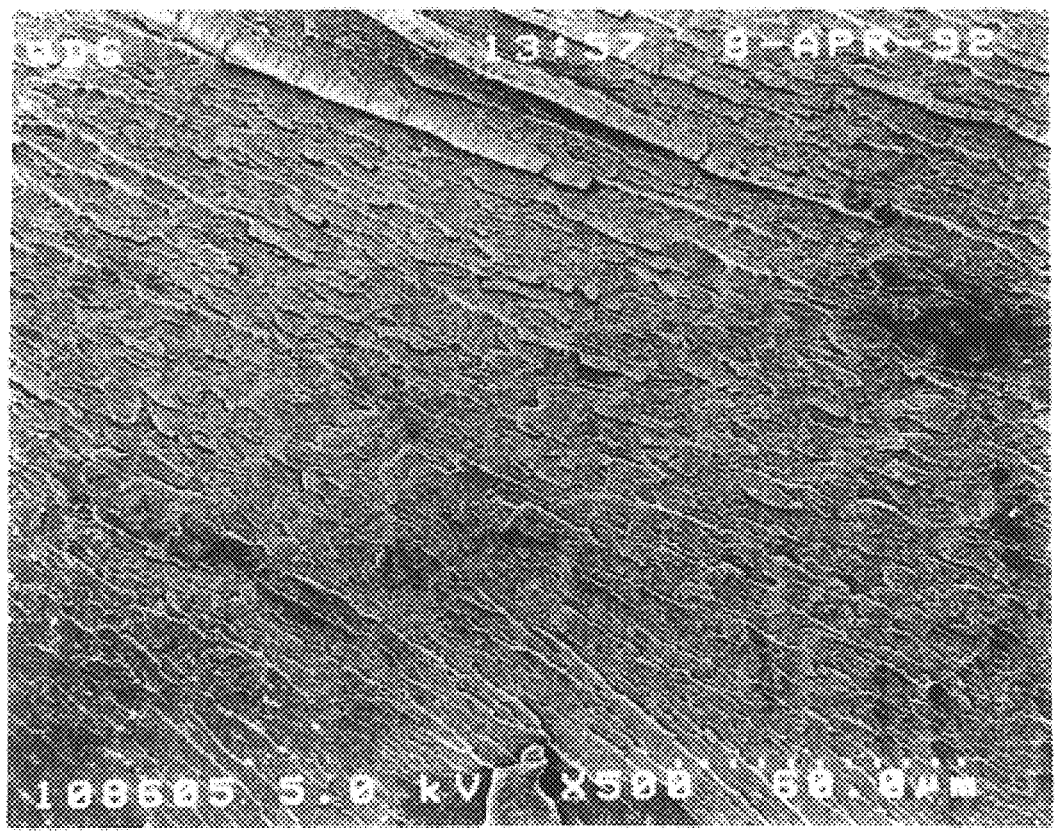
FIG. 4 is a microscopic photograph of a cut surface of the molded article obtained in Comparative Example 2.

Though a prior resin composition of a heat resisting thermoplastic resin and a fluorine-containing polymer could provide a uniform molded article only by a special method, according to the present invention, there can be provided a composition capable of easily making a uniform molded article by introducing a specific functional group into a fluorine-containing polymer.

The fluorine-containing polymer having a functional group is represented by the formula (I), and is characterized in that the polymer has hydroxy group or epoxy group (inclusive of a glycidyl group) at least at one of end portions of a main chain and end portions of side chains if present, and the fluorine-containing polymer (I) or a precursor polymer before introducing a functional group to obtain (I) is prepared by a radical polymerization. The details are mentioned hereinbelow.

The fluorine-containing polymer having a functional group of the present invention has basic structural units of X represented by —($CH_2$—$CX^1X^2$)— and Y represented by —($CF_2$—$CY^1Y^2$)—.

As monomers producing the structural unit X, there are employed, for instance, olefins such as ethylene, propylene, 1-butane and isobutylene; for instance, fluoroalkenes such as $CH_2=CHF$, $CH_2=CF_2$, $CH_2=C(CF_3)_2$ and $CH_2=CZ(CF_2)wZ$ (z is hydrogen atom or fluorine atom and w is an integer of 1 to 8. For instance, $CH_2=CHCF_2CF_2CF_2CF_3$, $CH_2=CHCF_2CF_2CF_2CF_2CF_3$, $CH_2=CFCF_3$, $CH_2=CFCF_2CF_3$, $CH_2=CFCF_2CF_2CF_2H$ and $CH_2=CFCF_2CF_2CF_2CF_2H$); alkylvinylethers, for instance, $CH_2=CHOCH_2CH_3$, $CH_2=CHOCH_2CH_2CH_2CH_3$ and

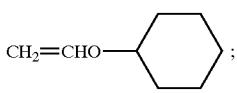

fluoroalkyl vinylethers, for instance, $CH_2=CHOCH_2CF_2CF_2H$, $CH_2=CHOCH_2CF_2CF_2CF_2CF_2H$ and $CH_2=CHOCH_2CH_2CF_2CF_2CF_2CF_2CF_3$; hydroxyalkyl vinylethers, for instance, $CH_2=CHOCH_2CH_2CH_2CH_2OH$; fluoroalkyl allylethers, for instance, $CH_2=CHCH_2OCH_2CH_2CF_2CF_3$; hydroxyalkyl allylethers, for instance, $CH_2=CHCH_2OCH_2CH_2OH$; alkyl or allylvinyl esters, for instance, $CH_2=CHOCOCH_3$, $CH_2=CHOCOC(CH_3)_3$ and

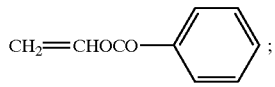

alkyl-α-substituted acrylates, of which substituent is hydrogen atom, fluorine atom or methyl, for instance, $CH_2=CHCOOCH_3$, $CH_2=C(CH_3)COOCH_3$ and $CH_2=CFCOOCH_3$; fluoroalkyl-α-substituted acrylates, of which substituent is hydrogen atom, fluorine atom or methyl, for instance, $CH_2=CHCOOCH_2CF_2CF_2CF_3$, $CH_2=C(CH_3)COOCH_2CF_2CF_3$, $CH_2=C(CH_3)COOCH_2CF_2CF_2H$ and $CH_2=CFCOOCH_2CF_2CF_3$; hydroxy(fluoro)alkyl-α-substituted acrylates, of which substituent is hydrogen atom, fluorine atom or methyl, for instance, $CH_2=CHCOOCH_2CH_2OH$, $CH_2=C(CH_3)COOCH_2CH_2OH$ and $CH_2=C(CH_3)COOCH_2CF_2CF_2CH_2OH$; $CH_2=CHCH_2C(CF_3)_2OH$; $CH_2=CHCH_2OH$;

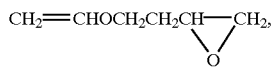

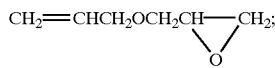

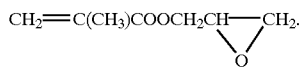

As monomers producing the structural unit Y, there are employed, for instance, fluoroalkenes such as $CF_2=CFH$, $CF_2=CF_2$, $CF_2=CFCl$, $CF_2=CZ(CF_2)_wZ$ (Z and w are the same as those mentioned hereinbefore, for instance, $CF_2=CHCF_3$, $CF_2=CFCF_3$, $CF_2=CFCF_2CF_3$ and $CF_2=CFCF_2CF_2H$ formulae, for instance, $CF_2=CFCH_2CH_2OH$, $CF_2=CFCF_2CH_2OH$, $CF_2=CFCF_2CF_2CH_2CH_2OH$ and

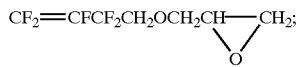

a compound represented by $CF_2=CF—R_f—(CH_2)_xB^2$ ($R_f$ and $B_2$ are the same as mentioned hereinabove, and x is an integer of 1 to 3); perfluoro(alkylvinyl ether), for instance, $CF_2=CFOCF_3$, $CF_2=CFO(CF_2CF(CF_3)O)_yCF_2CF_2CF_3$ (y is an integer of 1 to 3), and $CF_2=CFOCF_2CF_2CF_2CF_3$; formulae, for instance, $CF_2=CFOCF_2CF_2CH_2OH$, $CF_2=CFOCF_2CF_2CF_2CH_2OH$, $CF_2=CFOCF_2CF(CF_3)OCF_2CF_2CF_2CH_2OH$, $CF_2=CFOCF_2CF_2CH_2Br$, $CF_2=CFOCF_2CF_2CH_2OCF_2CF_2CH_2F$, $CF_2=CFOCF_2CF_2CH_2I$ and $CF_2=CFOCF_2CF(CF_3)OCF_2CF_2CH_2I$: a compound represented by $CF_2=CF—O—R_f—(CH_2)—B^2$ ($R_f$ and $B^2$ are the same as mentioned hereinabove, and z is an integer of 1 to 3); perfluoro (alkylallylether), for instance, $CF_2=CFCF_2OCF_2CF_2CF_3$.

The structural units X and Y each may comprise two kinds or more of structural units, Y may not be present, when X has the structural unit derived from $CH_2=CHF$, $CH_2=CF_2$ or fluoroalkyl-α-substituted acrylates (A substituent is hydrogen atom, fluorine atom or methyl). X may not be present, when Y has the structural unit derived from $CF_2=CF_2$ or $CF_2=CF_1$.

$A^1$ and $A^2$ representing the end portions of a main chain-X—Y— are cut pieces of an initiator or a chain transfer agent, for instance, $—OCOR^1$, $—OR^1$, $—R^1$, COOH, hydrogen atom, halogen atom ($R^1$ is an alkyl group or fluoroalkyl group having carbon atoms of 1 to 10), but not limited to those. When any of structural units X and Y does not include a structural unit having hydroxy group, epoxy group or glycidyl group, at least one of $A_1$ and $A^2$ must include hydroxy group, epoxy group or glycidyl group.

A basic component of a fluorine-containing polymer (a) having a functional group has the structure represented by the formula (I), and is formed by a radical polymerization. As is explicit from the formula (I), the polymer does not have an ether bond at a portion of the main chain. A fluorine-containing polymer having an ether bond at the bonded portion of the main chain, for instance, a perfluoroxy alkylene unit is also disclosed in JP-B-42446/1991 besides the JP-A-105062/1988, JP-A-254155/1988 and JP-A-264672/1988. That fluoropolyether is usually made by an ion polymerization, and is expensive. Furthermore, the fluoropolyether of a high molecular weight is difficult to be obtained. The fluoropolyether becomes in the form of grease or oil at room temperature or at a high temperature, and it is difficult to form a uniform blend of fluoropolyether alone with a thermoplastic resin, which results in deterioration of physical properties of the obtained blend. Also, it is difficult to introduce a side chain into the fluoropolyether.

A functional group (hydroxy group or epoxy group (Glycidyl group is also included therein hereinafter the same)) in the fluorine-containing polymer represented by the formula (I) can be made also by using the mentioned functional group-containing monomer, and also can be introduced, for example, by the method mentioned below.

For instance, there is a method (method with an initiator) to polymerize a basic component by the use of an initiator for the radical polymerization, which has a functional group to be introduced. When using, for instance, a hydroperoxide as an initiator, hydroxy group can be introduced at the end of the main chain.

Also, a functional group can be introduced by the use of a specific chain transfer agents (method with a chain transfer agent). Hydroxy group is introduced at the end of the main chain when, for instance, methanol and mercaptoethanol are used as a chain transfer agent.

Also, another preferable method is the one (polymer reaction method) to introduce a functional group at the end or side chain of a polymer by a polymer reaction after polymerization. The polymer reaction method includes a polymerization using a radical polymerization initiator, which can easily convert a cut piece of the initiator at the end of the polymer into an intended functional group after polymerization and, in the same manner, a polymerization using a chain transfer agent and comonomer, which can easily convert the ends of a main chain and side chain of the polymer into an intended functional group after polymerization.

As a polymer reaction method, there is an example, for instance, to convert, into an intended functional group, iodine at the end of a polymer polymerized by using, as a chain transfer agent, an iodinated compound containing an iodine, such as a fluorine-containing elastomer and a thermoplastic fluorine-containing elastomer. Concretely, suitable is a fluorine-containing elastomer disclosed in JP-A-40543/1977, which is mainly comprises a copolymer comprising a VDF and at least one kind of the other fluorine-containing monomers which are copolymerizable with the VDF, wherein 0.001 to 10% by weight, preferably 0.01 to 5% by weight of iodine is bonded at the end of a polymer chain, and a thermoplastic fluorine-containing elastomer disclosed in JP-B-4728/1982, which has at least one block of fluorine-containing resin as a hard segment and at least one block of fluorine-containing elastomer as a soft segment, wherein the thermoplastic fluorine-containing elastomer is a linear, branched or radial block copolymer having a weight ratio of fluorine-containing resin to fluorine-containing elastomer of 5:95 to 60:40. An iodine of a fluorine-containing polymer, of which end is iodinated, has much reactivity and can be converted to a functional group such as epoxy group, hydroxy group, carboxyl group, amino group and isocyanate group by the known organic chemical method. The end of the polymer becomes an epoxy group after addition of an allylalcohol and then dehydroiodination by an alkali, or becomes hydroxy group by adding ethylene and further reacting with dimethyl sulfoxide.

Also, as disclosed in JP-A-12734/1987, a side chain type fluorine-containing polymer having a functional group can be made by letting a halogen be contained in the side chain by copolymerizing 0.05 to 20% by mole of a halogen-containing monomer among those represented by the formula of $CF_2=CF)$—$(CF_2CFR^2O)_a$—$(CF_2CF_2CH_2O)_b$—$CF_2CF_2$—$CH_2$—$R^3$ (wherein $R^2$ is F or $CF_3$, a is an integer of 0 to 2, b is an integer of 0 to 2 and $R^3$ is a halogen atom), in which $R^3$ is selected from Cl, Br and I, and 80 to 99.95% by mole of a monomer producing a structural unit X and a structural unit Y if necessary, and then by converting to a functional group in the same manner as the example of the iodine terminated fluorine-containing polymer.

As a method to introduce a functional group by using a polymer reaction, there can be adopted, for instance, as shown in Polym. Mater. Sci Eng., 49,518 (1983), such a method as to add a nucleophilic functional group into a double bond produced by dehydrofluorinating a fluorine-containing elastomer having vinylidene fluoride with a base. However, that method has a drawback that the functional group is difficult to be quantitatively introduced.

It is naturally possible to further convert the fluorine-containing polymer having a functional group which is introduced by each of the mentioned methods, to the polymer having the desired functional group by applying the usual organic chemical technique to the polymer reaction. For instance, the iodine at the end and/or side chain of the fluorine-containing polymer can also be converted to glycidyloxy group by converting the iodine of the polymer to hydroxy group and further reacting with an epichlorohydrin.

Also, it is possible to combine the functional group introducing methods such as the method with an initiator, method with a chain transfer agent, copolymerization method and polymer reaction method. The reaction for introducing a functional group can also be carried out in a melting and kneading equipment such as an extruder, and not limited to in a polymerization reactor for a general use.

In the formula (I), such a polymer as containing $CH_2$ unit in a main chain in combination of X and Y as mentioned below is preferable because a wide range of temperature for kneading with a thermoplastic resin can be selected and a compatibility with the thermoplastic resin is relatively excellent among fluorine-containing polymers.

That is to say, one (referred to as Polymer P$^1$) is a polymer using CH$_2$=CF$_2$ (vinylidene fluoride: VDF) as at least one component of X in the formula (I) (others are the same as those of the formula (I)), and another one (referred to as Polymer P$^2$) is a copolymer containing at least one of hydrocarbon olefins as X (VDF is not contained) and at least one of CF$_2$=CF$_2$ (tetrafluoroethylene: TFE), CF$_2$=CFCl (chlorotrifluoro-ethylene: CTFE) or CF$_2$=CFCF$_3$ (hexafluoropropene: HFP) as Y (others are the same as those of the formula (I)). Any of those polymers has hydroxy group or epoxy group at least at one of the main chain and the end of the side chain thereof.

Among those polymers having CH$_2$ unit at the main chain, further preferable is the one which is excellent in a thermal stability (thermal resistance), when kneaded with a thermoplastic resin. The main chain and the end of the side chain, which have a functional group, are usually inferior to the other parts in thermal resistance, and it is unavoidable even if there is a thermal decomposition to a certain extent on kneading as far as an effect thereof can be recognized. However, at least main portions of the main chain and the side chain of the aforesaid fluorine-containing polymer having a functional group should have thermal resistance of 170° C. at lowest, preferably not less than 250° C. The thermal resistance depends mainly on a kind and ratio of components of the monomers to be used. In the Polymer P$^1$ and Polymer P$^2$, when a hydrocarbon olefin is used as X, it is recommendable to lower a ratio of the hydrocarbon olefins such as alkylvinyl ether and alkylvinyl ester excluding CH$_2$=CH$_2$, CH$_2$=CHCH$_3$ and CH$_2$=C(CH$_3$)$_2$ in the polymer to not more than 20% by mole. This is because those may be thermally the most unstable portions, among the monomers producing the fluorine-containing polymer having a functional group of the present invention The thermal resistance of the present invention means a temperature at the time of weight decrease by 1% in a measurement (raising at a rate of 10° C./minute) of a thermobalance in a nitrogen gas stream.

Among the Polymer P$^1$ and Polymer P$^2$, there are employed below particularly preferable fluorine-containing polymers having a functional group in order to further give the features such as oil resistance and chemical resistance, which are inherent to fluorine-containing polymers, to the composition, even if the thermal resistance is enough as mentioned hereinabove.

That is to say, the Polymer P$^1$ essentially comprises a polyvinylidene fluoride (PVDF) and VDF, and is obtained by copolymerization with at least one selected from, for instance, TFE, CTFE, perfluoro(alkylvinyl ether), perfluoro(alkylallyl ether), CH$_2$=C(CF$_3$)$_2$, CF$_2$=CZ(CF$_2$)$_w$Z (Z and w are the same as mentioned hereinabove), CH$_2$=CZ(CF$_2$)$_w$Z (Z and w are the same as mentioned hereinabove), CF$_2$=CFR$_f$(CH$_2$)$_x$—B$^2$ and fluorine-containing olefins such as fluoroalkene represented by CF$_2$=CFOR$_f$(CH$_2$)$_z$B$^2$ (R$_f$, B$^2$, x and z are the same as mentioned hereinabove), and occasionally furthermore with at least one hydrocarbon olefin selected from CH$_2$=CH$_2$, CH$_2$=CHCH$_3$ and CH$_2$=C(CH$_3$)$_2$, wherein at least one end of the main chain and the side chains of the polymer has hydroxy group or epoxy group.

The Polymer P$^2$ is a polymer containing at least one hydrocarbon olefin selected from CH$_2$=CH$_2$, CH$_2$=CHCH$_3$ and CH$_2$=C(CH$_3$)$_2$, at least one of TFE, CTFE, and CF$_2$=CFCF$_3$ (hexafluoropropene: HFP), and occasionally, further at least one fluorine-containing olefin selected from, for instance, perfluoro(alkylvinyl ether), perfluoro(alkylallyl ether), CH$_2$=C(CF$_3$)$_2$, CF$_2$=CZ(CF$_2$)$_w$Z (Z and w are the same as mentioned hereinabove), CH$_2$=CZ(CF$_2$)$_w$Z (Z and w are the same as mentioned hereinabove), fluoroalkylvinylether, CF$_2$=CFR$_f$(CH$_2$)$_x$—B$^2$ and fluoroalkene represented by CF$_2$=CFOR$_f$(CH$_2$)$_z$—B$^2$ (R$_f$, B$^2$, X and z are the same as mentioned hereinabove), wherein at least one end of the main chain and the side chains of the polymer has hydroxy group or epoxy group.

A molecular weight of the fluorine-containing polymer having a functional group of the present invention is the same level as those of a usual fluorine-containing resin and fluorine-containing elastomer except a PTFE which is said to have a high molecular weight of usually not less than millions, and is 2000 to 1000000 in a number-average molecular weight. When the molecular weight is too low, thermal resistance and chemical resistance are impaired, and therefore, it is necessary to decrease a content of a fluorine-containing polymer having a functional group in the composition. When the molecular weight is too high, moldability is impaired. Preferable number-average molecular weight differs depending on a kind of a thermoplastic resin and a purpose of the composition, but is about 10000 to 500000. A concentration of functional groups in the fluorine-containing polymer of the present invention may be a minimum necessary for improving a dispersion condition when blending with the thermoplastic resin. When the functional group is only at the end of a molecule, the concentration of the functional group is too low and the effect is insufficient unless the fluorine-containing polymer is of relatively low molecular weight. In case where a functional group is introduced at the side chain with a functional group-containing comonomer or by a high polymer reaction, the concentration of the functional group can be relatively freely selected irrespective of a molecular weight. However, an excessive concentration of the functional group is not desirable by the reason of a restriction in the production and in view of properties such as thermal resistance and chemical resistance of the composition. The concentration of the functional groups both at the ends and in side chains of the molecule can be 2 to 2000 μmol/g, particularly preferably 2 to 1000 μmol/g per the total weight of the fluorine-containing polymer.

The fluorine-containing polymer (a) having a functional group of the present invention may be in either resinous or elastomeric form depending on a kind of a monomer to be used and a ratio of components thereof. The resin is discriminated from the elastomer in a point that the latter has a glass transition temperature lower than room temperature, and either one can be selected depending on the purpose of a blend. The elastomeric fluorine-containing polymer having a functional group is used for the purposes to improve impact resistance of the thermoplastic resin and to obtain a blend in the elastomeric form.

In the present invention, the fluorine-containing polymer (a) having a functional group is blended with a thermoplastic resin (b) of a crystalline melting point or a glass transition temperature of not less than 150° C. As the thermoplastic resin (b), there are, for example, polyacetals, polyamides polycarbonates, polyphenylene ethers, aromatic polyesters, aromatic polyesteramides, aromatic azomethines, polyarylene sulfides, polysulfones, polyether sulfones, polyketones, polyether ketones, polyetherimides, polyamide imides, polymethyl pentenes and polyether nitrites. Among those, preferable for the present invention are thermoplastic resins which have a high thermal resistance, and do not deteriorate thermal resistance of a composition after mixed with the fluorine-containing polymer (a) having a functional group, or thermoplastic resins, for which usual impact modifiers and chemical resistance modifiers cannot be used because thermal resistance is deteriorated thereby. Examples of such resins are aromatic polyesters, polyamides, polyamide imides, polyarylene sulfides, polyketones, polyether nitrites, polycarbonates, polyphenylene ethers, polysulfones, polyetherimides and polyimides.

Further, particularly preferable are, for example, polyarylene sulfides, of which impact resistance is generally desired to be improved without impairing thermal resistance and chemical resistance, and polyamides which are desired to improve solvent resistance, particularly gasohol resistance for the use as materials for auto parts and aromatic polyesters which are expected to enhance moldability and mechanical properties of the fluorine-containing polymer, being added thereto. Among those, particularly preferable are liquid crystal polyesters forming an anisotropic melt, which can be expected to enhance, to a large extent, mechanical properties, moldability, dimensional stability and deflection temperature under load by enhancing a compatibility with the fluorine-containing polymer, because those polyesters have high modulus of elasticity and are excellent in moldability and dimensional stability.

Also, when considering reactivity of the fluorine-containing polymer (a) having a functional group of the present invention and a thermoplastic resin (b), since polyphenylene sulfides contain mercapto group, polyamides contain carboxyl group and amino group, and aromatic polyesters contain hydroxy group, carboxyl group and ester group, there is a high possibility of those resins' reacting with hydroxy group or epoxy group (also inclusive of glycidyl group) in the fluorine-containing polymer having a functional group of the present invention From this point of view, too, those resins are preferable.

The functional group of the fluorine-containing polymer of the present invention are epoxy group (including glycidyl group) and hydroxy group. The reactivity of those functional groups is high with an ester bond of a main chain and hydroxy group and carboxyl group at the end when the heat resisting thermoplastic resin (b) is an aromatic polyester, with an amide bond of main chain and carboxyl group and amino group at the end when the resin is a polyamide (PA), and with mercapto group at the end when the resin is a polyarylene sulfide. That is to say, it can be thought that those highly reactive functional groups are introduced in the fluorine-containing polymer, and partly react with the main chain or the end of the thermoplastic resin to improve a compatibility of the polymer or that the introduction of the functional group enhances a polarity of the fluorine-containing polymer, which improves an interface affinity with the thermoplastic resin and a dispersibility without particularly causing a chemical reaction. Also, it can be considered that a part of the thermoplastic resin causes a chemical reaction with the fluorine-containing polymer and the reaction products act as a compatibilizing agent.

Therefore, in the composition of the present invention, a blend of the fluorine-containing polymer (a) having the functional group and the thermoplastic resin (b) is presumed to be present in the form of (1) a mere mixture of the fluorine-containing polymer (a) having the functional group and the thermoplastic resin (b), (2) a reaction product between the fluorine-containing polymer (a) having the functional group and the thermoplastic resin (b) or (3) a mixture of (1) and (2).

Thus, though a mechanism of the blend is not clear, it does not limit the present invention.

It is not excluded from the present invention that the thermoplastic resin (b) is modified by a normal method in order to enhance an affinity or reactivity with the fluorine-containing polymer having a functional group of the present invention.

The resin composition of the present invention can also contain polymer components other than the thermoplastic resin (b) and the fluorine-containing polymer (a) having a functional group.

Preferable components are fluorine-containing polymers which have neither hydroxy group nor epoxy group at the main chain and the end of the side chain in the formula (I). Particularly preferable are (1) a perfluoro fluorine-containing resin or elastomer such as PTFE (including a copolymer having less than 1% by weight of fluorine-containing olefin copolymerable with TFE), TFE/perfluoro(alkylvinyl ether) copolymer (so-called PFA), TFE/HFP copolymer (so-called FEP) and TFE/perfluoro(alkylvinyl ether)/HFP terpolymer;

(2) a resinous copolymer, in which a mole ratio of an ethylene to a TFE and/or CTFE, which are known as a so-called ETFE and ECTFE, is 2:3 to 3:2 and the third fluorine-containing monomer copolymerable therewith is contained in an amount of 0 to 15% by mole per a total amount of the ethylene and the TFE and/or CTFE monomer, or an elastomeric copolymer having about 40 to 90% by mole of ethylene, about 0.1 to 20% by mole of TFE and/or CTFE and about 10 to 60% by mole of the third fluorine-containing monomer. As the third fluorine-containing monomer, there is used at least one of those represented by $CH_2=CZ(CF_2)_wZ$, $CF_2=CZ(CF_2)_wZ$, $CF_2=CFO(CF_2)_wZ$ (Z and w are the same as mentioned hereinabove) and $CH_2=C(CF_3)_2$;

(3) a PVDF and a VDF copolymer (a resinous or elastomeric copolymer of the VDF and at least one fluorine-containing olefin selected from TFE, CTFE, HFP, $CH_2=C(CF_3)_2$, $(CF_3)_2C=O$, and the like), wherein VDF/HFP copolymer, VDF/CTFE copolymer and VDF/TFE/HFP or CTFE terpolymer usually become an elastomer in the range of about 20 to 80% by mole of VDF, less than about 40% by mole of TFE, about 10 to 60% by mole of HFP and about 15 to 40% by mole of CTFE; and (4) other fluorine-containing resins or elastomers such as chlorotrifluoroethylene (PCTFE) and poly(fluoroalkyl-α-substituted acrylate) (a substituent is hydrogen atom, a methyl, fluorine atom or chlorine atom).

That is to say, in the compositions having three components of the aforesaid fluorine-containing polymer (a) having a functional group, the thermoplastic resin (b) and the fluorine-containing polymer having no functional group, it can be thought that a mixture of a part of the thermoplastic resin (b) in the composition and the fluorine-containing polymer (a) having a functional group functions as a compatibilizing agent and enhances a dispersibility, and a mechanical property, chemical resistance, and the like, which cannot be obtained in case of a simple blend of a fluorine-containing polymer having no functional group and a thermoplastic resin (b), can be enhanced.

Therefore, in those compositions, it is preferable that the fluorine-containing polymer (a) having a functional group and the fluorine-containing polymer having no functional group are highly compatible with each other.

For example, when mixing the perfluoro fluorine-containing resin or elastomer of (1) above and the polymer of (2) above, such as a ETFE and ECTFE, with the thermoplastic resin, it is the most preferable to mix a fluorine-containing polymer having a functional group, which has the functional group at the end or the side chain and has a structure similar to those of fluorine-containing polymers to be mixed therewith.

Also, when mixing the PVdF or the VdF copolymer of (3) above with the thermoplastic resin, it is the most preferable to mix the fluorine-containing polymer having a functional group, which is selected from PVdF and VdF copolymers and has the functional group at the end or the side chain thereof.

It is necessary to blend the thermoplastic resin (b) and the fluorine-containing polymer (a) having a functional group or to blend those and a fluorine-containing polymer having no functional group under melting and fluidizing conditions at least at not less than a crystalline melting point or a glass transition temperature of the thermoplastic resin. It is desirable that the fluorine-containing polymer having a functional group is also under melting conditions during blending, but a non-melting property may be maintained because of a high melting viscosity or a crosslinking property.

The resin composition of the present invention has the functional group at the end of the main chain and/or the side chain, and is obtained by mixing a fluorine-containing polymer (a) having a molecular weight of 2000 to 1000000 and a thermoplastic resin (b) having a crystalline melting point or glass transition temperature of not less than 150° C. The polymer (a) is 0.1 to 99% by weight, and the resin (b) is 1 to 99.9% by weight.

When (a) is 0.1 to 40% by weight and (b) is 60 to 99.9% by weight, such properties as an impact resistance, sliding property, chemical resistance and moldability can be improved by a fluorine-containing polymer, though those properties are drawbacks for many of thermoplastic resins. Also, when (a) is 40 to 99% by weight and (b) is 1 to 60% by weight, a strength, deflection temperature under load, moldability and dimensional stability of the fluorine-containing polymer can be improved by the thermoplastic resin When, in a weight ratio to the resin composition, (a) is less than 0.1% by weight and (b) is less than 1% by weight, the effect of that improvement becomes unsatisfactory.

A content, in the composition, of a fluorine-containing polymer having a functional group and a kind thereof differ depending on a kind, position, concentration, basic component and molecular weight of the functional group, and therefore, cannot be determined unequivocally but is selected depending on a kind of thermoplastic resin to be blended in the mentioned range and a purpose of blending.

The preferable resin composition of the present invention is the composition comprising a fluorine-containing polymer having hydroxy group or epoxy group at the end of main chain or the side chain and a polyarylene sulfide, polyamide, aromatic polyester or polycarbonate.

A polyarylene sulfide is excellent in thermal resistance, chemical resistance, and mechanical properties, but inferior in impact resistance.

There can be obtained a composition, of which impact resistance is improved by mixing a fluorine-containing elastomer particularly having a number-average molecular weight of 2000 to 200000, among fluorine-containing polymers (a) having a functional group.

As a functional group of the fluorine-containing elastomer having a functional group, there are employed hydroxy group and epoxy group (including glycidyl group). Either of those groups enhances a dispersibility and impact resistance.

A preferable concentration of the functional group differs depending on a kind and mixing ratio of a fluorine-containing elastomer and a polyarylene sulfide, and 2 to 2000 $\mu$mol/g, particularly 2 to 1000 $\mu$mol/g is sufficiently effective per a total amount of the fluorine-containing elastomer.

As the aforesaid fluorine-containing elastomers having a functional group, there can be used those, in which the functional groups are introduced at the respective ends or side chains thereof, such as vinylidene fluoride-hexafluoropropylene copolymer, vinylidene fluoride-tetrafluoroethylene-hexafluoro-propylene copolymer, vinylidene fluoride-chlorotri-fluoroethylene copolymer, vinylidene fluoride-tetrafluoro-ethylene-chlorotrifluoroethylene copolymer, propylene-tetrafluoroethylene copolymer, tetrafluoroethylene-perfluoroalkyl vinyl ether copolymer, tetrafluoroethylene-vinylidene fluoride-propylene copolymer, ethylene-tetrafluoroethylene-hexafluoropropylene copolymer, ethylene-hexafluoropropylene copolymer, perfluoroalkyl acrylate elastomer, tetrafluoroethylene-alkylvinylether copolymer, and tetrafluoroethylene-alkylvinylester copolymer. Among those, particularly preferable are vinylidene fluoride-hexafluoropropylene copolymer, vinylidene fluoride-tetrafluoroethylene-hexafluoro-propylene copolymer and propylene-tetrafluoroethylene copolymer, in which hydroxy group or epoxy group (including glycidyl group) is introduced respectively.

The fluorine-containing elastomer having a functional group and the polyarylene sulfide can be used in the range of 0.1 to 40% by weight and 60 to 99.9% by weight, respectively, particularly preferably 5 to 30% by weight and 70 to 90% by weight, respectively.

When the fluorine-containing elastomer having a functional group is less than 5% by weight, impact resistance cannot be improved sufficiently, and contrarily when exceeding 30% by weight, mechanical strength decreases remarkably.

Perfluoro fluorine-containing resins (PTFE, FEP, PFA, and the like), ETFE, ECTFE, PVdF and VDF copolymer resins are excellent in thermal resistance, chemical resistance, weather resistance, electrical properties, and the like, but there are many cases where those resins are inferior to the heat resisting crystalline thermoplastic resin (b) in mechanical properties and physical thermal resistance as represented by a deflection temperature under load.

The mechanical property and deflection temperature under load, which fluorine-containing resins themselves have, can be improved, instead of using the aforesaid fluorine-containing resins, by blending an aromatic polyester or polycarbonate with the fluorine-containing resin having a functional group of the present invention, which is introduced at the end or the side chain thereof, or by using, as a compatibilizing agent, the fluorine-containing polymer having a functional group of the present invention, for the mentioned blend of the fluorine-containing resin and the aromatic polyester or polycarbonate.

When blending with the aromatic polyester or polycarbonate, the both of hydroxy group and epoxy group (including glycidyl group) of the present invention can be used as the functional group of the fluorine-containing polymer having the functional group. It is more preferable to use the fluorine-containing polymer having hydroxy group at the end or side chain thereof, which is considered to easily cause an transesterification with an ester bond or carbonate bond in the main chain of the aromatic polyester or polycarbonate.

A preferable concentration of the functional group differs depending on the kind of the fluorine-containing polymer and the kind and ratio of the aromatic polyester or polycarbonate, and 2 to 2000 µmol/g, particularly 2 to 1000 µmol/g is sufficiently effective per a total weight of the fluorine-containing polymer having a functional group.

When blending two components of the fluorine-containing resin having a functional group and the aromatic polyester or polycarbonate, various fluorine-containing resins having a functional group can be selected, and those having hydroxy group at the end or side chain thereof, such as PTFE, FEP, PFA, ETE, ECTFE, PVdF, and VDF-TFE copolymer are preferable. Mechanical properties and deflection temperature under load, which each of the corresponding fluorine-containing resins themselves has, can be improved.

In case of a blend composition by blending the fluorine-containing polymer having a functional group of the present invention as a compatibilizing agent with a blend of the fluorine-containing resin and the aromatic polyester or polycarbonate, various combinations can be used. Most preferable are those such as a composition obtainable by blending a mixture of perfluoro fluorine-containing resin (PTFE, FEP, PFA, and the like) and aromatic polyester or polycarbonate, wherein each of the corresponding perfluoro fluorine-containing resins, in which hydroxy group is introduced at the end or side chain thereof, is blended as a compatibilizing agent, a composition obtainable by blending a mixture of a ETFE (or ECTFE) and an aromatic polyester or polycarbonate with ethylene/tetrafluoroethylene copolymer (or ethylene/chlorotrifluoroethylene copolymer), in which hydroxy group is introduced at the end or side chain thereof, and a composition obtainable by blending a mixture of a PVDF and an aromatic polyester or polycarbonate with a fluorine-containing polymer selected from a PVDF or VDF copolymer, in which hydroxy group is introduced at the end or side chain thereof.

In those cases, a content of the fluorine-containing polymer having a functional group, as a compatibilizing agent effective for enhancing a dispersibility, is 0.5 to 30% by weight, preferably 1 to 15% by weight per a total weight of the composition.

Also, by melting and blending an aromatic polyester with particularly a fluorine-containing elastomer having hydroxy group, among the fluorine-containing polymers having a functional group, there occurs partially a chemical reaction (transesterification and the like), and a thermoplastic elastomer composition can be obtained. Also, thermoplastic elastomers having various hardnesses can be obtained by melting and blending the fluorine-containing elastomer having hydroxy group and the aromatic polyester at an optionally selected blending ratio. A preferable concentration of a functional group differs depending on the kinds, blending ratio, and the like of the fluorine-containing elastomer and the aromatic polyester or polycarbonate, but is 2 to 2000 µmol/g, particularly preferably 2 to 1000 µmol/g per total weight of the fluorine-containing elastomer.

In that case, as the fluorine-containing elastomer having hydroxy group, there can be used a vinylidene fluoride-hexafluoropropylene copolymer, vinylidene fluoride-tetrafluoroethylene-hexafluoro-propylene copolymer, vinylidene fluoride-chloro-trifluoroethylene copolymer, vinylidene fluoride-tetrafluoroethylene-chlorotrifluoroethylene copolymer, propylene-tetrafluoroethylene copolymer, tetrafluoro-ethylene-perfluoroalkyl vinyl ether copolymer, tetrafluoroethylene-vinyliden fluoride-propylene copolymer, ethylene-tetrafluoroethylene-hexafluoro-propylene copolymer, ethylene-hexafluoropropylene copolymer, perfluoroalkyl acrylate elastomer, tetrafluoroethylene-alkylvinyl ether copolymer and tetrafluoroethylene-alkylvinyl ester copolymer, in which hydroxy group is introduced at the end or side chain thereof. Among those, particularly preferable are vinylidene fluoride-hexafluoropropylene copolymer, vinylidene fluoride-tetrafluoroethylene-hexafluoro-propylene copolymer and propylene-tetrafluoroethylene copolymer, in which hydroxy group is introduced at the respective ends or side chains thereof.

In that thermoplastic elastomer composition, a weight ratio of the fluorine-containing elastomer having hydroxy group can be 50 to 99.9% by weight, and that of the aromatic polyester or polycarbonate, 0.1 to 50% by weight. In order to provide a high temperature flowability as the thermoplastic resin together with an elasticity as the elastomer, particularly preferable is 70 to 98% by weight of the fluorine-containing elastomer having hydroxy group and 2 to 30% by weight of the aromatic polyester or polycarbonate.

The modifying composition and the thermoplastic elastomer composition of the fluorine-containing polymer mentioned hereinabove can be used.

As the aromatic polyester, there are employed, for example, a condensate of dibasic acids such as adipic acid, terephthalic acid, 2,6-naphthalene-dicarboxylic acid and 4,4'-biphenil carboxylic acid, and dihydric alcohols such as ethylene glycol, trimethylene glycol, tetramethylene glycol, pentamethylene glycol, hexamethylene glycol, 1,4-cyclohexanedimethanol and bisphenol A (for instance, polyethylene terephthalate, polybutylene terephthalate, poly 1,4-cyclohexane dimethylene terephthalate, poly[2,2-propane bis(4-phenyltere/isophthalate)]); an aromatic polyester (liquid crystal copolyester) forming an anisotropic melt phase, and the like.

Among those, it is preferable to use a liquid crystal copolyester having a high strength because of an orientation thereof and showing a high flowability on melting. As the liquid crystal copolyesters, there are employed those comprising, for example one or more of aromatic dicarboxylic acid and alicyclic dicarboxylic acid; one or more of aromatic diol, alicyclic diol and aliphatic diol; one or more of aromatic hydroxycarboxylic acids. Typical combinations are, for instance, the one having main components of p-hydroxybenzoic acid, biphenildiol and terephthalic acid (for example, Econol E2000 and E6000 available from Sumitomo Chemical Industries, Co., Ltd., Xydar RC/FC400 and 300 available from Nippon Petrochemicals Co., Ltd., Vectra C series available from Polyplastics Co., Ltd., UENO LCP2000 available from Ueno Fine Chemicals Industry Ltd. and Idemitsu LCP300 available from Idemitsu Petrochemical Co., Ltd.); the one having main components of p-hydroxybenzoic acid and 6-hydroxynaphthoic acid (for example, VICTREX SRP available from ICI Japan Ltd., UENO LCP1000 available from Ueno Fine Chemicals Industry Ltd., Vectra A series available from Polyplastics Co., Ltd., Novaculate, E324 available from Mitsubishi Kasei Corp., Idemitsu LCP300 available from Idemitsu Petrochemical Co., Ltd. and Rodrun LC-5000 available from Unitika Ltd.); the one having main components of p-hydroxybenzoic acid, terephthalic acid and aliphatic diol (for example, Novaculate E3 10 available from Mitsubishi Kasei Corp., Idemitsu LCP100 available from Idemitsu Petrochemical Co., Ltd., Rodrun LC-3000 of Unitika Ltd., and X7G available from Eastman Kodak Co.).

When blending these liquid crystal copolyesters and the fluorine-containing elastomer having a functional group of the present invention, in consideration of thermal resistance of the fluorine-containing elastomer having a functional group, preferable are copolyesters having a relatively low melting temperature, such as the one mainly comprising p-hydroxybenzoic acid and 6-hydroxynaphthoic acid, or the one mainly comprising p-hydroxybenzoic acid, terephthalic acid and aliphatic diol.

Polyamide resins are excellent in high strength, high toughness and processability, and are widely used for hoses, tubes, pipes, and the like. On the other hand, those resins, though being excellent generally in oil resistance, are week against alcohol solvents. Particularly when gasolines containing low grade alcohol are used, oil resistance (gasohol resistance) deteriorates, and volumetric swelling and fuel permeability increase, which causes deterioration of materials such as decrease in strength.

The solvent resistance and gasohol resistance of that polyamide can be improved by blending the fluorine-containing polymer having a functional group of the present invention with the polyamide and also by applying, as a compatibilizing agent, the fluorine-containing polymer having a functional group to the blend of the fluorine-containing polymer and the polyamide.

In that case, the both of hydroxy group and epoxy group (including glycidyl group) of the present invention can be used as the functional group of the fluorine-containing polymer. Particularly preferable are the polymers having epoxy group (including glycidyl group) at the end or the side chain thereof, because epoxy group is considered to have a good reactivity with the both of carboxyl group and amino group at the end of a polyamide resin.

When blending two components of the fluorine-containing polymer having a functional group and the polyamide, various polymers can be selected depending on the purpose and uses thereof, and particularly preferable are ETFE, ECTFE, PVDE, VDF copolymer resins and fluorine-containing elastomer, of which respective ends or side chains have a functional group.

Also, when blending three components, that is to say, the fluorine-containing polymer having a functional group of the present invention as a compatibilizing agent and a blend of a fluorine-containing polymer and polyamide, various combinations can be used. The most preferable are a composition comprising a blend of a ETFE (or ECTFE) and a polyamide and, as a compatibilizing agent, an ethylene/tetrafluoroethylene (or ethylene/chlorotrifluoroethylene) copolymer which has epoxy group (including glycidyl group) at the end or side chain thereof, a composition comprising a blend of a PVDF and a polyamide and, as a compatibilizing agent, a fluorine-containing polymer selected from a PVDF and a VDF copolymer, which has epoxy group (including glycidyl group) at the end or side chain thereof, and a composition comprising a blend of a VDF copolymer and a polyamide resin and a fluorine-containing polymer selected from a PVDF and a VDF copolymer, which has epoxy group (including glycidyl group) at the end or side chain thereof.

In that case, a content of the fluorine-containing polymer having a functional group, which is effective for enhancing a dispersibility as a compatibilizing agent, is 0.5 to 30% by weight, preferably 2 to 15% by weight per a total amount of the composition.

As the polyamide resins of the present invention, there can be used nylon 6, nylon 6,6, nylon 11, nylon 12, nylon 610, nylon 46, nylon MCX-A, nylon MXD 6, and the like.

Further, the resin composition of the present invention may contain fibrous reinforcements, for example, glass fiber, carbon fiber, ceramic fiber, potassium titanate fiber and aramide fiber, inorganic fillers, for example, calcium carbonate, talc, mica, clay, carbon powder, graphite, and glass beads, and inorganic or organic fillers usually used, for example, heat resisting resins such as polyimides, colorants and flame retarders within ranges not impairing the effect of the present invention A content thereof is usually 1 to 70% by weight per the composition weight. At that time, there is a case where an effect thereof is enhanced more because of the presence of a non-reacted functional group being contained in the resin composition of the present invention.

The present invention is explained further concretely by means of the following Reference Examples, Examples and Comparative Examples. It is to be understood that the present invention is not limited to the scope.

The fluorine-containing polymers synthesized in the Reference Examples and the resin compositions obtained in Examples and Comparative Examples were evalulated by the following test methods.

Test Methods (1) Measurement of Thermal Resistance of the Fluorine-containing Polymer Having a Functional Group A temperature was measured at the time when the weight decreased by 1% in nitrogen (30 ml/min.) at heat-up rate of 10° C./min. by the use of a heat analyzing unit DT-30 type of Shimazu Corporation.

(2) Izod Impact Test

An Izod notched impact strength was measured in accordance with ASTM D256 by the use of a U-F impact tester of Ueshima Seisakusho Ltd.

(3) Electronmicroscopic Observation

A molded article of a resin composition was frozen and broken in liquid nitrogen, and the section thereof was observed by a scanning type electron microscope. Further, a hundred of the fluorine-containing polymer particles were optionally selected from the microscopic photograph (150 $\mu$m×200 $\mu$m), and an average particle size was obtained therefrom.

(4) Tension Test

A tensile strength was measured in accordance with ASTM D638 by the use of a Tensilon universal tester of Orientec Corporation and a type 5 dumbbell.

(5) Melt Flow Rate

A melt flow rate was measured at a temperature of 250° C. and a load of 20 kgf/cm$^2$ for 300 seconds of preheating by the use of a flow tester of Shimazu Corporation.

(6) Deflection Temperature Under Load

Measurement was made under the conditions of a load of 18.5 kgf/cm$^2$ and thermal up rate of 2° C./min. in N$_2$ stream by the use of a thermal distortion tester (No. 148 HD-500-PC type) of Yasuda Seiki Seisakusho Ltd.

(7) Solvent Resistance

A volume change was measured by the use of a mixed solvent of toluene/isooctane/methanol at 40/40/20% by volume respectively in accordance with JIS-K630 after 70 hr dipping at 100° C.

REFERENCE EXAMPLE 1

By the method disclosed in Example 3 (1) of JP-B-49327/1986, there was obtained a white aqueous latex which contained 25% by weight of solids of 50/20/30% by mole of vinylidene fluoride/tetrafluoroethylene/hexafluoropropylene copolymer which was provided with iodine at the end thereof by a method with a chain transfer agent. A part of that latex was frozen, coagulated, rinsed and dried, thus an achromatic transparent elastomer was obtained. A number-average molecular weight of that polymer, which was obtained by GPC analysis (solvent: THF, column temperature: 40° C.), was about 140 thousands by a conversion with polystyrene, and an iodine content by an element analysis was 0.22% by weight. Also, thermal resistance of that polymer was 401° C.

A 2000 ml four neck flask equipped with an agitator, cooling tube, thermometer and nitrogen blowing tube was charged with 1000 g of that latex and 4.2 g of allyl alcohol, and was then heated to 70° C. on a water bath, being agitated under a nitrogen stream at a flow rate of about 0.2 m/min. 10 ml of an aqueous solution, in which 20 mg of ammonium persulfate had been melted, was added in the flask, and a reaction was started. After a lapse of seven hours, heating and agitation were stopped for cooling. After having been frozen and coagulated, the latex was rinsed and dried, and an achromatic transparent elastomer was obtained. Subsequently a 2000 ml four neck flask equipped with an agitator, cooling tube and thermometer was charged with 250 g of that elastomer and 1 liter of ethyl acetate, and heating and agitation were carried out to melt the polymer. With a flask inner temperature being kept at 70° C., 200 g of an aqueous solution having 10% by weight of potassium hydroxide was added, and the reaction was done for seven hours. The reacted solution was poured into a large amount of methanol to re-precipitate and recover the polymer which was then rinsed and dried. A content of iodine at the end thereof was 0.14% by weight by an element analysis, and the epoxidation ratio obtained by an iodine amount having decreased by the epoxidation reaction was 36%. Also, thermal resistance of the polymer was 356° C. and the glass transition point was −9° C. The concentration of epoxy group contained in that polymer was calculated with a number-average molecular weight, that is, 5 $\mu$mol/g.

REFERENCE EXAMPLE 2

A 1-liter pressure vessel equipped with an agitator was charged with 500 g of the latex of the iodine terminated fluorine-containing elastomer synthesized in Reference Example 1, and after substituting the inner gas sufficiently with nitrogen gas, the vessel pressure was increased to 0.8 MPa by ethylene gas with the vessel temperature being kept at 70° C. under the agitation. By forcedly charging 50 mg of APS, immediately a pressure drop started. At the stage where a pressure drop was no longer found after a lapse of 14 hours, the vessel temperature was lowered to room temperature, and the remaining pressure was discharged to complete the reaction. After freezing and coagulating of the resulting latex, rinsing and drying were carried out to obtain an achromatic transparent elastomer. In the infrared absorption spectrum of that polymer, there was recognized a characteristic absorption of CH bond of ethylene introduced in the end iodine, at 3024 cm$^{-1}$.

Then a 1000 ml four neck flask equipped with an agitator, cooling tube, thermometer and nitrogen blowing tube was charged with 68 g of that elastomer, 3.0 g of dimethyl sulfoxide, 400 g of butyl acetate and 2 g of water, and were heated up to 110° C., being agitated under a nitrogen gas stream at a rate of about 0.2 ml/min. After a lapse of five hours, heating and agitation were stopped, and the yellow-colored polymer solution was obtained. That solution was poured into a large amount of methanol to recover the polymer. Afterwards rinsing and drying were repeated in the methanol to obtain light yellowish elastomer. In the infrared absorption spectrum of that polymer, there was recognized a characteristic absorption of hydroxy group caused by the end reaction, at 3400 cm$^{-1}$.

The content of the end iodine by an element analysis was 0.10% by weight, and the hydroxylation ratio obtained by the iodine amount having decreased by the hydroxylation reaction was 55%. Also, thermal resistance of that polymer was 453° C., and the glass transition point was −9° C. The concentration of hydroxy group contained in that polymer was calculated by a number-average molecular weight, that is, 8 $\mu$mol/g.

REFERENCE EXAMPLE 3

A 3-liter stainless autoclave equipped with a stainless agitation blade and a jacket for temperature control was charged with 1425 ml of deionized water and 0.75 g of emulsifier (ammonium perfluorooctanoate), and oxygen in a system was substituted with a nitrogen gas three times to discharge oxygen therefrom Then the autoclave was charged with 8.1 g of $CF_2=CFCF_2CH_2OH$, and 78 g of a vinylidene fluoride/tetrafluoroethylene/hexafluoropropylene (3/1/1 of mole ratio) mixture monomer was forcedly charged. By keeping the agitator at 400 rpm and the inner temperature at 40° C., the inner pressure became 1.2 MPa. Then an aqueous ammonium persulfate solution (6 g/25 ml), aqueous sodium sulfite solution (3.18 g/25 ml), and aqueous ferric sulfate solution (3.66 g/25 ml) were forcedly charged in order with the mixture monomer. During the reaction, the mixture monomer was continuously supplied to keep the temperature at 40° C., the agitation of 400 rpm and the inner pressure of 1.1 MPa Also, an ammonium persulfate amounting to a half of that supplied at the time of starting the reaction was additionally supplied four hours later.

When the amount of vinylidene fluoride/tetrafluoroethylene/hexafluoropropylene (3/1/1, mole ratio) mixture monomer consumption for the reaction had reached 400 g after addition of initiators (about 15 hours later), the agitation and supply of the mixture monomer were stopped immediately, and gases remaining in the autoclave were discharged until normal pressure was reached, and the reaction completed. The obtained fluorine-containing copolymer was rinsed and dried under the reduced pressure at 70° C. for 24 hours. The resulting dried powder was 430 g in total.

An absorption peak reverted to hydroxy group of $CF_2=CFCF_2CH_2OH$ was recognized at 3420 cm$^{-1}$ of the infrared absorption spectrum of the film obtained by compression-molding of the dried powder. The element analysis and the 19F nuclear magnetic resonance analysis (NMR) indicate that the fluorine-containing polymer comprised a vinylidene fluoride/tetrafluoroethylene/hexafluoropropylene/$CF_2=CFCF_2CH_2OH$ (7.4/2 5.6/16.8/0.2). A number-average molecular weight of that polymer, which was obtained by GPC analysis (solvent:THF, column temperature: 40° C.), was about 60 thousands by a conversion with polystyrene. Also, thermal resistance of that polymer was 401° C., and the glass transition point was −18° C. The concentration of the hydroxy group contained in the polymer is calculated to be 18 $\mu$mol/g.

REFERENCE EXAMPLE 4

A 3-liter stainless autoclave equipped with a stainless agitation blade and a jacket for temperature control was charged with 1425 ml of deionized water and 0.75 g of emulsifier (ammonium perfluorooctanoate), and oxygen in the system was substituted with a nitrogen gas three times to discharge oxygen therefrom. Then the autoclave was charged with 3 g of $CF_2=CFCF_2CH_2OH$, and 78 g of a mixture monomer of vinylidene fluoride/tetrafluoroethylene/hexafluoropropylene (3/1/1, mole ratio) was forcedly charged therein. By keeping an agitation at 400 rpm and an inner temperature at 40° C., the inner pressure became 1.2 MPa Subsequently an aqueous ammonium persulfate solution (6 g/25 ml), aqueous sodium sulfite solution (3.18 g/25 ml), and aqueous ferric sulfate solution (3.66 g/25 ml) were forcedly charged in order with the mixture monomer. During the reaction, the temperature was kept at 40° C. and the agitation, at 400 rpm. The mixture monomer was continuously supplied to keep the inner pressure at 1.1 MPa. Also, the ammonium persulfate was additionally continuously supplied in a total amount of 3 g for ten hours from the start of the reaction When the amount of the mixture monomer of vinylidene fluoride/tetrafluoroethylene/hexafluoropropylene (3/1/1, mole ratio), which had been consumed by the reaction after addition of initiators, reached 400 g (after a lapse of about 22 hours), the agitation and supply of the mixture monomer were immediately stopped, and gases remaining in the autoclave were discharged until the normal pressure was reached, and the reaction was completed. The obtained fluorine-containing copolymer was coagulated and rinsed, and then dried at 70° C. for 24 hours under the normal pressure. The resulting dried powder was 380 g in total.

The element analysis and $^1$H, $^{19}$F nuclear magnetic resonance analysis (NMR) indicate that the fluorine-containing polymer comprised a vinyliden fluoride/tetrafluoroethylene/hexafluoropropylene/$CF_2$=$CFCF_2CH_2OH$ (62.8/23.8/13.3/0.08, mole ratio). A number-average molecular weight of the polymer, which was obtained by GPC analysis (solvent: THF, column temperature: 40° C.), was about 210 thousands by a conversion with polystyrene. Thermal resistance of that polymer was 445° C., and the glass transition point was –19° C. The concentration of OH group contained in the polymer is calculated to be 12 $\mu$mol/g.

REFERENCE EXAMPLE 5

In accordance with the method disclosed in JP-A-12734/1987, a white aqueous latex having 21% by weight of solids of a vinylidene fluoride/tetrafluoroethylene/hexafluoropropylene/$CF_2$=$CFOCF_2CF_2CH_2I$ (49.7/19.9/29.8/0.6, mole ratio) copolymer was obtained. After coagulated, that latex was rinsed and dried to obtain an achromatic transparent elastomer. A number-average molecular weight of the polymer, which was measured by GPC analysis (solvent: THF, column temperature: 40° C.), was about 140 thousands by a conversion with polystyrene. The iodine content measured by an element analysis was 0.72% by weight. Also, thermal resistance of that polymer was 403° C.

A 6-liter autoclave made of glass, which was equipped with a glass lining agitation blade and a jacket for temperature control, was charged with 3300 g of that latex, and after oxygen in the system was substituted with a nitrogen gas three times, the inner pressure was increased up to 0.9 Mpa with an ethylene gas with the agitation and inner temperature being kept at 305 rpm and 70° C. respectively. Subsequently an aqueous ammonium persulfate solution (30 mg/2 ml) was forcedly charged with a nitrogen gas. During the reaction, the temperature was kept at 70° C., and the agitation, at 305 rpm.

When a pressure drop was no longer found (after a lapse of about 13.5 hours), gases remaining in the autoclave were discharged until the normal pressure was reached, and the reaction was completed. The obtained fluorine-containing copolymer was coagulated and rinsed, and then dried at 80° C. for 48 hours under the normal pressure. Thus the achromatic transparent elastomer was obtained. The resulting dried polymer was 690 g in total.

By $^1$H nuclear magnetic resonance analysis (NMR), it was confirmed that a peak of 4.0 ppm resulting from —$CF_2CH_2I$ bond had disappeared and ethylene had been added. An element analysis indicates 0.57% by weight of iodine, and a number-average molecular weight of the polymer, which was measured by GPC analysis (solvent: THF, column temperature: 40° C. ), was about 140 thousands by a conversion with polystyrene. Also, thermal resistance of that polymer was 427° C.

A 1000 ml four neck flask equipped with an agitator, cooling tube, thermometer and nitrogen gas blowing tube was charged with 100 g of ethylene-added iodine-terminated fluorine-containing elastomer, 400 g of dimethyl sulfoxide (DMSO) and 2 g of water, and was heated to 100° C., being agitated under bubbling with nitrogen gas blown at a rate of about 0.2 ml/min. Five hours later, heating and agitating were stopped, and a yellow-colored polymer was obtained. That polymer was melted in acetone to obtain a yellow-colored polymer solution That solution was poured in a large amount of methanol for recovering the polymer which was then, after further rinsing, dried at 100° C. for 24 hours under normal pressure, and a light yellow polymer was obtained.

The iodine content by an element analysis was 0.11% by weight. The hydroxylation ratio calculated by an iodine amount having decreased by the hydroxylation reaction was 80.7%. The thermal resistance of that polymer was 452° C. The concentration of hydroxy group contained in that polymer is calculated by the number-average molecular weight to be 57 $\mu$mol/g.

EXAMPLE 1

A 60 cm$^3$ Brabender mixer set at 300° C. was filled with 50.4 g of polyphenylene sulfide (Tohpren T4 of Tohpren Co., Ltd.), and melting was carried out for four minutes at 50 rpm Then 7.6 g of the polymer obtained in Reference Example 1 was added, and then kneaded for six minutes at 100 rpm. In that case, the degree of the torque increase during kneading was larger than that of Comparative Example 1 as described hereinafter. The obtained composition was compression-molded at 300° C., and a test piece was made. The test results are shown in Table 1.

EXAMPLES 2, 3 AND 4

44.8 G of a polyphenylene sulfide resin was kneaded and molded in the same manner as in Example 1, with the use of 15.2 g each of the polymers obtained in Reference Examples 1, 2 and 3, and a test piece was made. The test results are shown in Table 1.

EXAMPLE 5

44.8 G of a polyphenylene sulfide resin, 3.2 g of the polymer obtained in Reference Example 1 and 15.2 g of a fluorine-containing elastomer (Daiel G70 1 of Daikin Industries, Ltd.) comprising a vinylidene fluoride/hexafluoropropylene copolymer were kneaded and molded in the same manner as in Example 1, and a test piece was made. The test results are shown in Table 1.

COMPARATIVE EXAMPLE 1

44.8 G of a polyphenylene sulfide resin and 15.2 g of a fluorine-containing elastomer (Daiel G70 1 of Daikin Industries, Ltd.) comprising a vinylidene fluoride/hexafluoropropylene copolymer were kneaded and molded in the same manner as in Example 1, and a test piece was made. The test results are shown in Table 1.

COMPARATIVE EXAMPLE 2

A 60 cm³ Brabender mixer set at 300° C. was filled with 60 g of a polyphenylene sulfide resin, and melting was carried out at 500 rpm for four minutes, and further melting was done at 100 rpm for six minutes. Then a test piece was made in the same manner as in Example 1. The test results are shown in Table 1.

TABLE 1

|  | Examples | | | | | Comparative Examples | |
|---|---|---|---|---|---|---|---|
|  | 1 | 2 | 3 | 4 | 5 | 1 | 2 |
| Components (% by weight) | | | | | | | |
| Fluorine-containing polymer (a) having a functional group | | | | | | | |
| Reference Example 1 | 4.7 | 9 | — | — | 1.8 | — | — |
| Reference Example 2 | — | — | 13.8 | — | — | — | — |
| Reference Example 3 | — | — | — | 25 | — | — | — |
| Thermoplastic resin (b) | 87 | 75 | 75 | 75 | 71 | 75 | 100 |
| Others | 8.3[1] | 16[1] | 11.2[1] | — | 27.2[2] | 25[3] | — |
| Properties of molded article | | | | | | | |
| Izod impact strength (kgcm/cm) | 1.7 | 2.1 | 4.2 | 4.5 | 1.7 | 1.5 | 1.4 |
| Average dispersion particle size ($\mu$m) | 3 | 4 | 1 | 2 | 5 | 9 | — |

[1]Vinylidene fluoride/tetrafluoroethylene/hexafluoropropylene copolymer (equal to non-reacted portion of Reference Examples 1 and 2)
[2]A mixture of a vinylidene fluoride/hexafluoropropylene copolymer (Daiel G701 of Daikin Industries, Ltd.) and a non-reacted portion of Reference Example 1
[3]Daiel G 701 alone of (2) above FIGS. 1, 2, 3 and 4 are microscopic photographs (×500) respectively showing the cut surfaces of the molded articles obtained in Example 2 and 3 and Comparative Examples 1 and 2.

As is clear from FIGS. 1 to 4, a dispersibility of a fluorine-containing elastomer of a blend of the fluorine-containing elastomer (Reference Examples 1 and 2), in which a functional group is introduced, with a polyphenylene sulfide (Example 2-FIG. 1, and Example 3-FIG. 2 respectively) is better than the case (Comparative Example-FIG. 3) where the conventional fluorine-containing elastomer is blended. Thus it can be observed that the improvement of mechanical property (Izod impact strength) are effectively done.

EXAMPLE 6

A 60 cm³ Brabender mixer set at 200° C. was filled with 8.3 g of liquid crystal copolyester (Novaculate E310 of Mitsubishi Kasei Corp.) which was melted at 10 rpm for 1.5 minutes. Then 73.8 g of the polymer obtained in Reference Example 3 was added at 50 rpm, and was kneaded at 100 rpm for five minutes. The obtained composition was compression-molded at 200° C., and a test piece was made. The test results are shown in Table 2.

EXAMPLE 7

8.3 G of liquid crystal copolyester (Novaculate E3 10) was kneaded with 73.8 g of the polymer obtained in Reference Example 4 and molded in the same manner as in Example 6, and a test piece was made. The test results are shown in Table 2.

EXAMPLE 8

8.3 G of liquid crystal copolyester (Novaculate E310) was kneaded with 73.9 g of the polymer obtained in Reference Example 5 and molded in the same manner as in Example 6, and a test piece was made. The test results are shown in Table 2.

COMPARATIVE EXAMPLE 3

420 G of a fluorine-containing polymer having no functional group was obtained in the same manner as in Reference Example 3 except that $CF_2=CFCF_2CH_2OH$ was not used.

The components of the fluorine-containing polymer, which was obtained by an element analysis and $^1H$, $^{19}F$ nuclear magnetic resonance analysis (NMR), was vinylidene fluoride/tetrafluoroethylene/hexafluoropropylene (61.3/18.9/19.8, mole ratio). A number-average molecular weight of that polymer was calculated by GPC analysis (solvent: THF, column temperature: 40° C.) to be about 210 thousands by a conversion with polystyrene. The thermal resistance of that polymer was 456° C., and the glass transition point was −17° C.

73.8 G of that fluorine-containing polymer having no functional group was kneaded with 8.3 g of liquid crystal copolyester (Novaculate E310) and molded, and then a test piece was made in the same manner as in Example 6. The test results are shown in Table 2.

COMPARATIVE EXAMPLE 4

73.9 G of the fluorine-containing elastomer which was prepared by coagulating, rinsing and drying a latex synthesized in Reference Example 5 prior to addition of ethylene thereto, was kneaded with 8.2 g of liquid crystal copolyester (Novaculate E310) and molded, and then a test piece was made in the same manner as in Example 6. The test results are shown in Table 2.

TABLE 2

|  | Examples | | | Comparative Examples | |
|---|---|---|---|---|---|
|  | 6 | 7 | 8 | 3 | 4 |
| Components (% by weight) | | | | | |
| Fluorine-containing polymer (a) having a functional group | | | | | |
| Reference Example 3 | 90 | — | — | — | — |
| Reference Example 4 | — | 90 | — | — | — |
| Reference Example 5 | — | — | 72.6 | — | — |
| Thermoplastic resin (b) | 10 | 10 | 10 | 10 | 10 |
| Others | — | — | 17.4[(1)] | 90[(2)] | 90[(3)] |
| Properties of molded article | | | | | |
| Maximum tensile strength (kgf/cm$^2$) | 186 | 146 | 29.7 | 9.0 | 5.6 |
| Melt flow rate (g/10 min) | 74.4 | 59.3 | 7.3 | 108 | 119 |

[(1)]Vinylidene fluoride/tetrafluoroethylene/hexafluoropropylene/$CF_2$=$CFOCF_2CF_2CH_2CH_2CH_2I$ copolymer (equal to non-reacted portion of Reference Example 7)
[(2)]A mixture of vinylidene fluoride/tetrafluoroethylene/hexafluoropropylene copolymer (synthesized in Comparative Example 3) and non-reacted portion
[(3)]Vinylidene fluoride/tetrafluoroethylene/hexafluoropropylene/$CF_2$=$CFOCF_2CF_2CH_2I$ copolymer (obtained by coagulating, rinsing and drying a latex before addition of ethylene, which was synthesized in Example 5)

Figure 5:
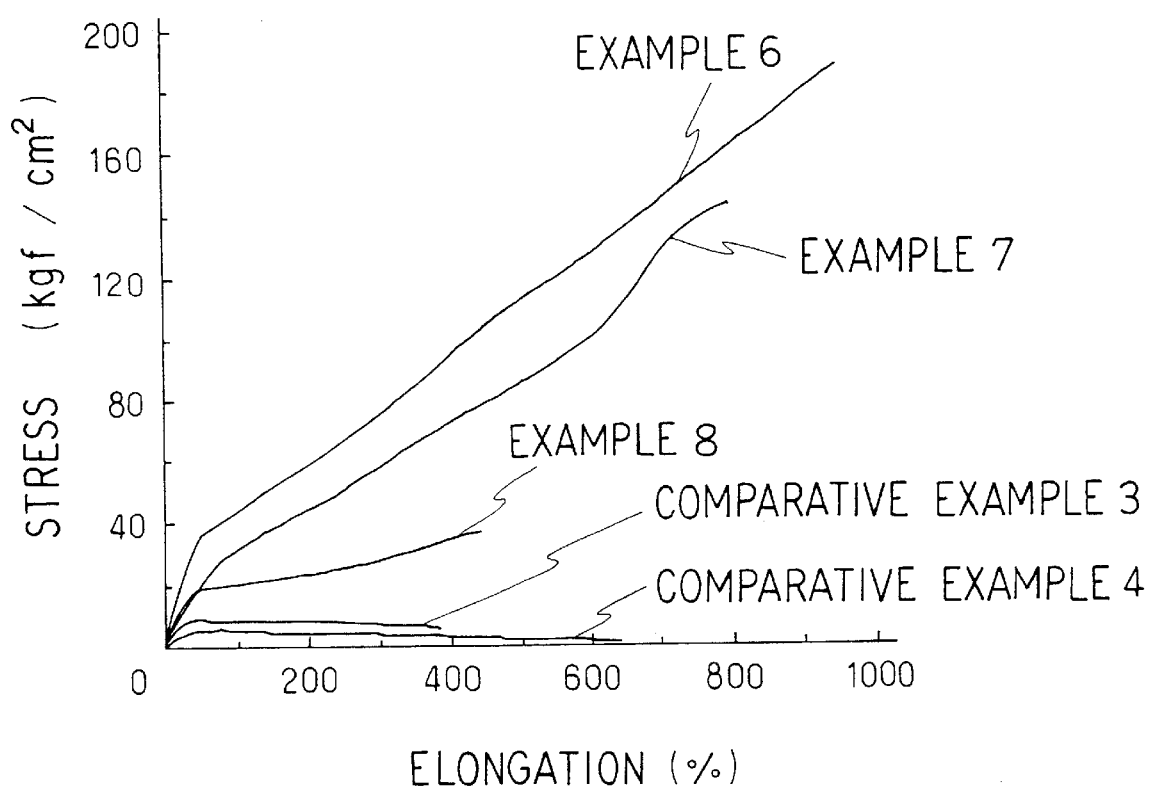
FIG. 5 is a stress-strain curve of the molded article obtained in Examples 6 to 8 and Comparative Examples 3 and 4.

FIG. 5 shows a stress-strain curve obtained in Reference Examples 6, 7, 8 and Comparative Examples 3 and 4.

As is clear from Table 2 and FIG. 5, a blend (same as those of Reference Examples 6, 7 and 8) of a fluorine-containing elastomer (synthesized in Reference Examples 3, 4 and 5), in which a functional group was introduced, and a liquid crystal copolyester shows a high stress against the elongation and has crosslinking rubber like physical properties. Also the blend of the functional group-introduced fluorine-containing elastomer and the liquid crystal copolyester shows a high temperature flowability, and therefore has thermoplastic elastomeric properties. Because a blend (same as those of Comparative Examples 3 and 4) with a fluorine-containing elastomer having no functional group is a mere blend of a non-vulcanized rubber and a liquid crystal copolyester, and therefore has a flowability at high temperature but shows only a low stress against an elongation.

EXAMPLE 9

8.0 G of a polycarbonate (Panlite L1225WP available from Teijin Chemicals Ltd.) and 72.4 g of the polymer obtained in Reference Example 4 were kneaded in the Brabender mixer set at 285° C. in the same manner as in Example 6. The obtained composition was compression-molded at 285° C., and a test piece was made. The test results are shown in Table 3.

EXAMPLE 10

8.1 G of polybutyrene terephthalate (Valox 310 available from GE Plastics Japan Ltd.) and 73.3 g of the polymer obtained in Reference Example 4 were kneaded in the Brabender mixer set at 240° C. in the same manner as in Example 6. The obtained composition was compression-molded at 240° C., and a test piece was made. The test results are shown in Table 3.

COMPARATIVE EXAMPLE 5

Kneading and molding were carried out by the use of a fluorine-containing polymer having no functional group as shown in Comparative Example 3 in the same manner as in Example 9, and a test piece was made. The test results are shown in Table 3.

COMPARATIVE EXAMPLE 6

Kneading and molding were carried out by the use of a fluorine-containing polymer having no functional group as shown in Comparative Example 3 in the same manner as in Example 10, and a test piece was obtained. The test results are shown in Table 3.

TABLE 3

|  | Examples | | Comparative Examples | |
|---|---|---|---|---|
|  | 9 | 10 | 5 | 6 |
| Components (% by weight) | | | | |
| Fluorine-containing elastomer (a) having a functional group (Synthesized in Reference Example 4) | 90 | 90 | — | — |
| Thermoplastic resin (b) | | | | |
| Polycarbonate | 10 | — | 10 | — |
| Polybutyrene terephthalate | — | 10 | — | 10 |
| Fluorine-containing elastomer (1) having no functional group | — | — | 90 | 90 |
| Properties of molded article | | | | |
| Maximum tensile strength (kgf/cm$^2$) | 163 | 119 | 10.7 | 10.4 |

TABLE 3-continued

|  | Examples | | Comparative Examples | |
|---|---|---|---|---|
|  | 9 | 10 | 5 | 6 |
| Elongation at break (%) | 695 | 647 | — | — |
| Melt flow rate (g/10 min) | 4.9 (Measured at 300° C.) | 130 (Measured at 290° C.) | 110 (Measured at 300° C.) | 102 (Measured at 290° C.) |

(1) Vinylidene fluoride/tetrafluoroethylene/hexafluoropropylene copolymer (synthesized in Comparative Example 3)

When blending a fluorine-containing elastomer (synthesized in Reference Example 4) with a polycarbonate (Example 9) and also polybutyrene terephthalate (Example 10), the resulting blend shows a strong stress against an elongation, and further shows a high temperature flowability, which represents thermoplastic elastomeric properties. Contrary to that, the compositions of Comparative Examples 5 and 6 show only a low stress against an elongation like non-vulcanized rubbers.

EXAMPLE 11

There were uniformly blended a PVDF (Neoflon VDF VP-800 available from Daikin Industries, Ltd.), a liquid crystal polyester (Vectra A9 50-non-reinforced available from Polyplastic Co., Ltd.) and a fluorine-containing polymer having a functional group as shown in Reference Example 4, in a weight ratio shown in Table 4. Then kneading and extruding were carried out at 280° to 300° C. by a twin screw extruder to make pellets. By the use of those pellets, test pieces were made at a cylinder temperature of 240° to 290° C. and a mold temperature of 50° C. by an injection molding machine. The test results are shown in Table 4.

COMPARATIVE EXAMPLE 7

By the use of a PVDF (same as that of Example 11) and a liquid crystal polyester (same as that of Example 11), kneading and extruding were carried out in the same manner as in Example 11, and a test piece was made by an injection molding. The test results are shown in Table 4.

EXAMPLE 8

The pellets of the PVDF (same as that of Example 11) were injection-molded under the same conditions as in Example 11, and a test piece was obtained. The test results are shown in Table 4.

TABLE 4

|  | Example | Comparative Examples | |
|---|---|---|---|
|  | 11 | 7 | 8 |
| Components (% by weight) | | | |
| Fluorine-containing polymer (a) having a functional group Reference Example 4 | 3 | — | — |
| Thermoplastic resin (b) | | | |
| Liquid crystal polyester | 20 | 20 | — |
| Others | | | |
| PVDF resin | 77 | 80 | 100 |
| Deflection temperature under load (° C.) | 146 | 130 | 101 |

It is known from Table 4 that the deflection temperature under load can be further improved to a large extent by adding the fluorine-containing polymer having a functional group (the one synthesized in Reference Example 4) when blending the fluorine-containing resin and the liquid crystal polyester, as compared with the blend (Comparative Example 7) of only a fluorine-containing resin and a liquid crystal polymer.

EXAMPLE 12

A 60 cm³ Brabender mixer set at 190° C. was charged with 40.4 g of polyamide 12 (Rilsan AMNφ available from Toray Industries, Inc.) which was then melted at 10 rpm for 1.5 minutes. 10.1 g of the polymer obtained in Reference Example 1 was added at 50 rpm and was kneaded at 80 rpm for 7 minutes. The obtained composition was compression-molded at 200° C., and a test piece was made. The test results are shown in Table 5.

EXAMPLE 13

A 60 cm³ Brabender mixer set at 190° C. was charged with 40.2 g of polyamide 12 (same as that of Example 12) and 13.4 g of PVdF (same as that of Example 11), and melting was carried out at 10 rpm for two minutes. 2.5 G of the polymer obtained in Reference Example 1 was added at 50 rpm, and kneaded at 80 rpm for seven minutes. The obtained composition was compression-molded at 200° C., and a test piece was made. The test results are shown in Table 5.

COMPARATIVE EXAMPLE 9

Kneading and molding were carried out in the same manner as in Example 12 except that the fluorine-containing elastomer (Daiel G902 available from Daikin Industries, Ltd.) was used instead of the fluorine-containing polymer having functional group obtained in Reference Example 1, and a test piece was made. The test results are shown in Table 5.

COMPARATIVE EXAMPLE 10

A 60 cm³ Brabender mixer set at 190° C. was charged with 40.1 g of polyamide 12 (same as that of Example 12) and 10.0 g of PVDF (same as that of Example 11), and kneading was carried out at 10 rpm for two minutes and further at 80 rpm for seven minutes. The obtained composition was compression-molded at 200° C., and a test piece was made. The test results are shown in Table 5.

COMPARATIVE EXAMPLE 11

The pellets of polyamide 12 (same as that of Example 12) was compression-molded, and a test piece was made. The test results are shown in Table 5.

TABLE 5

|  | Examples | | Comparative Examples | | |
|---|---|---|---|---|---|
|  | 12 | 13 | 9 | 10 | 11 |
| Components (% by weight) | | | | | |
| Fluorine-containing elastomer (a) having a functional group (Synthesized in Reference Example 1) | 20 | 5 | — | — | — |
| Thermoplastic resin (b) Polyamide | 80 | 80 | 80 | 80 | 100 |
| Others | | | | | |
| PVDF | — | 15 | — | 20 | — |
| Fluorine-containing elastomer (1) | — | — | 20 | — | — |
| Solvent resistance test | | | | | |
| Volume change (%) | 18 | 16 | 27 | 23 | 30 |
| Izod impact strength (kgcm/cm) | 3.8 | — | 2.0 | — | 1.8 |
| Average dispersion particle size (μm) | 1 | — | 6 | — | — |

(1) Vinylidene fluoride/tetrafluoroethylene/hexafluoropropylene copolymer (Daiel G902 of Daikin Industries, Ltd.)

As is clear from Table 5, the blend (same as that of Example 12) of a fluorine-containing polymer having a functional group and a polyamide and the blend (same as that of Example 13) of a fluorine-containing polymer having a functional group and a mixture of a PVDF and polyamide shows a good effect on the improvement in chemical resistance (gasohol resistance).

Figure 6:
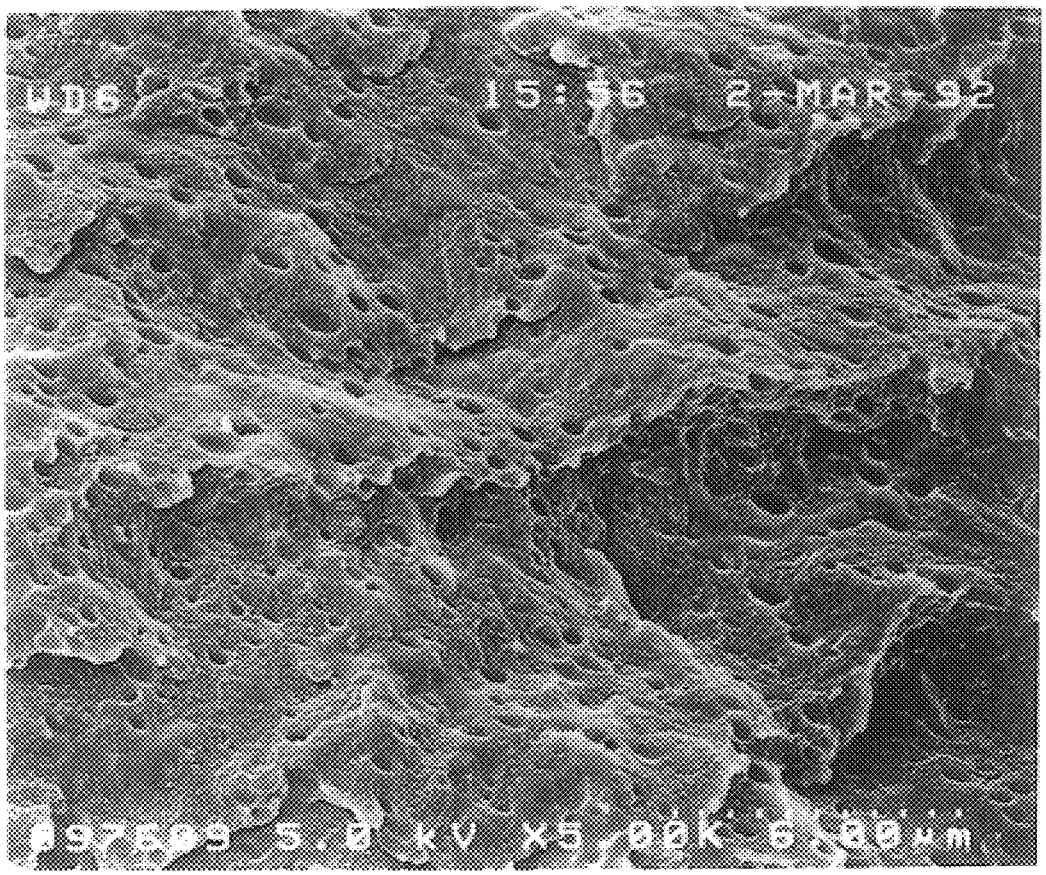
FIG. 6 is a microscopic photograph of a cut surface of the molded article obtained in Example 12.
Figure 7:
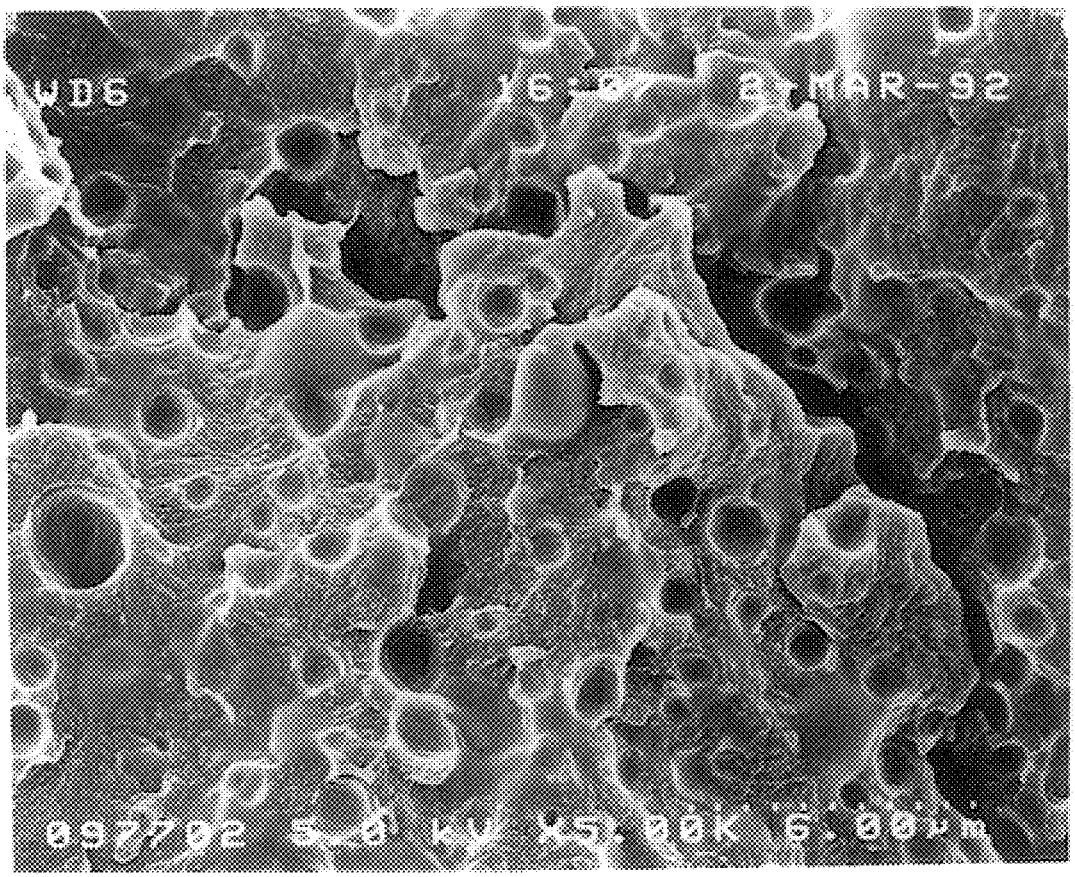
FIG. 7 is a microscopic photograph of a cut surface of the molded article obtained in Comparative Example 9.

FIGS. 6 and 7 show microscopic photographs (×5000) of cut surfaces of the molded articles obtained in Example 12 and Comparative Example 9, respectively.

As is clear by comparing FIG. 6 with 7, the blend (same as that of Example 12) of a fluorine-containing polymer (synthesized in Reference Example 1) having a functional group and a polyamide shows a good dispersibility of the fluorine-containing polymer as compared with the blend (same as that of Comparative Example 9) of a fluorine-containing polymer having no functional group and a polyamide. It is observed that mechanical properties (Izod impact strength) are effectively carried out.

By introducing a functional group in a fluorine-containing polymer, an interfacial affinity of the resin composition of the present invention is improved, and the resin composition is presented as the materials suitable for various functional parts, having excellent mechanical properties and moldability of the thermoplastic resin together with excellent chemical resistance and impact resistance of the fluorine-containing polymer.

INDUSTRIAL APPLICABILITY

In the present invention, the fluorine-containing polymer (a) having a functional group is blended with the thermoplastic resin (b) of a crystalline melting point or glass transition temperature of not less than 150° C. As thermoplastic resins, there are, for example, polyacetals, polyamides, polycarbonates, polyphenylene ethers, aromatic polyesters, aromatic polyesteramides, aromatic azomethines, polyarylene sulfides, polysulphones and polyether sulfones, polyketones and polyether ketones, polyetherimides, polyamide imides, polymethylpentenes, polyether nitrites and also polymer alloy mainly comprising those resins. Among those, preferable for the present invention are such resins, for which general modifiers for impact resistance and chemical resistance cannot be used because of insufficient thermal resistance as a melting and kneading temperature is not less than 200° C. As such resins, there are aromatic polyesters, polyamides, polyamide imides, polyarylene sulfides, polyketones, polyether nitrites, polycarbonates, polyphenylene ethers, polysulphones, polyether imides, and polyimides.

What is claimed is:

1. A method of improving affinity in resin compositions of a heat resistive thermoplastic resin (b) having a crystalline melting point or glass transition temperature of not less than 150° C., which comprises blending the heat resistive thermoplastic resin (b) with a fluorine-containing polymer (a) having a functional group and a number-average molecular weight of 2000 to 1000000; said fluorine-containing polymer (a) having the functional group is at least one selected from fluorine-containing polymers having functional groups, in which a concentration of the functional group at a main chain end portion and side chain portion is 2 to 2000 μmol/g per the total weight of the fluorine-containing polymer, and represented by the formula (1):

$$A^1-(X)-(Y)-A^2 \tag{1}$$

wherein X is a structural unit of the formula $-(CH_2CX^1X^2)-$ (wherein $X^1$ and $X^2$ are the same or different, and each is hydrogen atom, fluorine atom, $-(HCH_2)_p-(O)_q-R-B^1$ (R is a dihydric hydrocarbon group having carbon atoms of 1 to 20 or dihydric fluorine-substituted organic group having carbon atoms of 1 to 20, $B^1$ is hydrogen atom, fluorine atom, hydroxy group or epoxy group, p is 0 or 1 and q is 0 or 1), $-CO-R-B^1$ (R and $B^1$ are the same as above) or $-COO-R-B^1$ (R and $B^1$ are the same as above));

Y is a structural unit of the formula $-(CF_2CY^1Y^2)-$ (wherein $Y^1$ and $Y^2$ are the same or different, and each is hydrogen atom, fluorine atom, chlorine atom, $-(CF_2)_r-(O)_s-R_f)_t-(CH_2)_u-B^2$ ($R_f$ is a dihydric fluorine-substituted organic group having carbon atoms of 1 to 14, $B^2$ is hydrogen atom, halogen atom, hydroxy group, epoxy group or glycidyloxy group, r is 0 or 1, s is 0 or 1, t is 0 or 1, and u is an integer of 1 to 3) or $S(CF_2)_v-B^3$ ($B^3$ is hydrogen atom, fluorine atom or chlorine atom, and v is an integer of 1 to 10));

both $A^1$ and $A^2$ are end portions of a main chain;

provided that each of X and Y may comprise two or more structural units;

Y may not be present when X has the structural unit derived from $CH_2=CHF$, $CH_2=CF_2$ or fluoroalkyl-α-substituted acrylate (substituent is hydrogen atom, fluorine atom or methyl);

X may not be present when Y has the structural unit derived from $CH_2=CF_2$ or $CH_2=CHCl$;

at least one of $A^1$ and $A^2$ contains hydroxy group, epoxy group or glycidyl group when both of X and Y do not contain hydroxy group, epoxy group or glycidyl group, wherein the heat resistive thermoplastic resin (b) is at least one member selected from the group consisting of aromatic polyesters, polyamide imides, polyarylene sulfides, polyketones, polyether nitrites, polycarbonates, polyphenylene ethers, polysulfones, polyether sulfones, polyether imides and polyimides.

* * * * *